(12) United States Patent
Woodington et al.

(10) Patent No.: US 8,072,370 B2
(45) Date of Patent: Dec. 6, 2011

(54) SYSTEM AND METHOD FOR GENERATING AN ALERT SIGNAL IN A DETECTION SYSTEM

(75) Inventors: Walter G. Woodington, Lincoln, MA (US); Wilson J. Wimmer, Hudson, NH (US)

(73) Assignee: Valeo Radar Systems, Inc., Hudson, MA (US)

( * ) Notice: Subject to any disclaimer, the term of this patent is extended or adjusted under 35 U.S.C. 154(b) by 414 days.

(21) Appl. No.: 12/445,381

(22) PCT Filed: Oct. 31, 2007

(86) PCT No.: PCT/US2007/023019
§ 371 (c)(1),
(2), (4) Date: Apr. 13, 2009

(87) PCT Pub. No.: WO2008/063367
PCT Pub. Date: May 29, 2008

(65) Prior Publication Data
US 2010/0039311 A1    Feb. 18, 2010

Related U.S. Application Data

(60) Provisional application No. 60/863,663, filed on Oct. 31, 2006.

(51) Int. Cl.
*G01S 13/93* (2006.01)
(52) U.S. Cl. ............ 342/70; 342/92; 342/196; 340/435; 340/436; 340/903; 701/301
(58) Field of Classification Search ............ 342/70–72, 342/64, 91–92, 192, 196; 340/435–436, 340/903; 701/301
See application file for complete search history.

(56) References Cited

U.S. PATENT DOCUMENTS

| | | | | |
|---|---|---|---|---|
| 5,341,142 A | * | 8/1994 | Reis et al. | 342/64 |
| 5,638,281 A | * | 6/1997 | Wang | 701/301 |
| 6,784,828 B2 | * | 8/2004 | Delcheccolo et al. | 342/70 |

(Continued)

FOREIGN PATENT DOCUMENTS
WO    WO 2006/111480 A1    10/2006

OTHER PUBLICATIONS

PCT Search Report of the ISA for PCT/US2007/023019 dated Jun. 13, 2008,7,124,027.

(Continued)

*Primary Examiner* — John Sotomayor
(74) *Attorney, Agent, or Firm* — Daly, Crowley, Mofford & Durkee, LLP

(57) ABSTRACT

A system and method for generating alert signals in a detection system is described. The system compares data extracted from signals received via receive antenna beams with stored scenarios and determines whether to generate an alert signal based upon the results of the compare operation. The comparison of data extracted from received signals with stored scenarios can be accomplished by using one or more latches to process the extracted data from the received signals. In one embodiment, raw detections are pre-processed to generate so-called field of view (FOV) products. The FOV products are then provided to a tracker. In another embodiment, rather than pre-process the raw detections, the raw detections are instead provided directly to a tracker which processes the raw detections to provide products including, but not limited to, relative velocity and other parameters.

26 Claims, 18 Drawing Sheets

U.S. PATENT DOCUMENTS

| | | | |
|---|---|---|---|
| 6,956,469 B2* | 10/2005 | Hirvonen et al. | 340/435 |
| 6,967,612 B1* | 11/2005 | Gorman et al. | 342/22 |
| 7,068,211 B2* | 6/2006 | Oswald et al. | 342/70 |
| 7,124,027 B1 | 10/2006 | Ernst, Jr. et al. | |
| 7,227,493 B2* | 6/2007 | Oswald et al. | 342/70 |
| 7,366,595 B1* | 4/2008 | Shimizu et al. | 701/301 |
| 7,640,108 B2* | 12/2009 | Shimizu et al. | 701/301 |
| 7,724,134 B2* | 5/2010 | Icove et al. | 340/567 |
| 7,792,641 B2* | 9/2010 | Liu et al. | 701/301 |
| 7,881,868 B2* | 2/2011 | Greene et al. | 701/301 |
| 2003/0151541 A1* | 8/2003 | Oswald et al. | 342/70 |
| 2004/0119633 A1* | 6/2004 | Oswald et al. | 342/70 |
| 2005/0090982 A1 | 4/2005 | Mead et al. | |
| 2005/0104748 A1* | 5/2005 | Block | 340/945 |
| 2006/0092043 A1* | 5/2006 | Lagassey | 340/907 |
| 2006/0206243 A1* | 9/2006 | Pawlicki et al. | 701/1 |
| 2007/0043491 A1* | 2/2007 | Goerick et al. | 701/41 |
| 2007/0109411 A1* | 5/2007 | Jung et al. | 348/207.1 |
| 2007/0219720 A1* | 9/2007 | Trepagnier et al. | 701/300 |
| 2008/0043108 A1* | 2/2008 | Jung et al. | 348/207.1 |
| 2008/0046150 A1* | 2/2008 | Breed | 701/45 |
| 2008/0309488 A1* | 12/2008 | Icove et al. | 340/552 |
| 2008/0312830 A1* | 12/2008 | Liu et al. | 701/301 |
| 2008/0312831 A1* | 12/2008 | Greene et al. | 701/301 |
| 2008/0312832 A1* | 12/2008 | Greene et al. | 701/301 |
| 2010/0039311 A1* | 2/2010 | Woodington et al. | 342/70 |
| 2011/0181456 A1* | 7/2011 | Luebbert et al. | 342/70 |

OTHER PUBLICATIONS

PCT Written Opinion of the ISA for PCT/US2007/023019 dated Jun. 13, 2008,7,124,027.

PCT International Preliminary Report on Patentability dated May 14, 2009 for PCT/US2007/023019 filed on Oct. 31, 2007, 8 pgs.

Official Communication from European Patent Office dated Mar. 17, 2010 for EP07 867 331.6.

Response to European Patent Office Official Communication dated Sep. 21, 2010 for EP07 867 331.6.

* cited by examiner

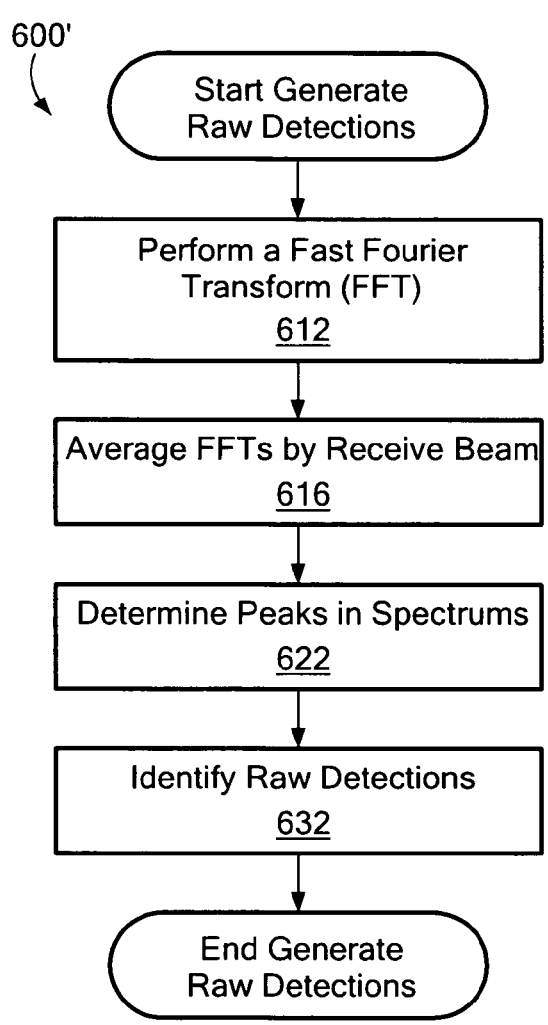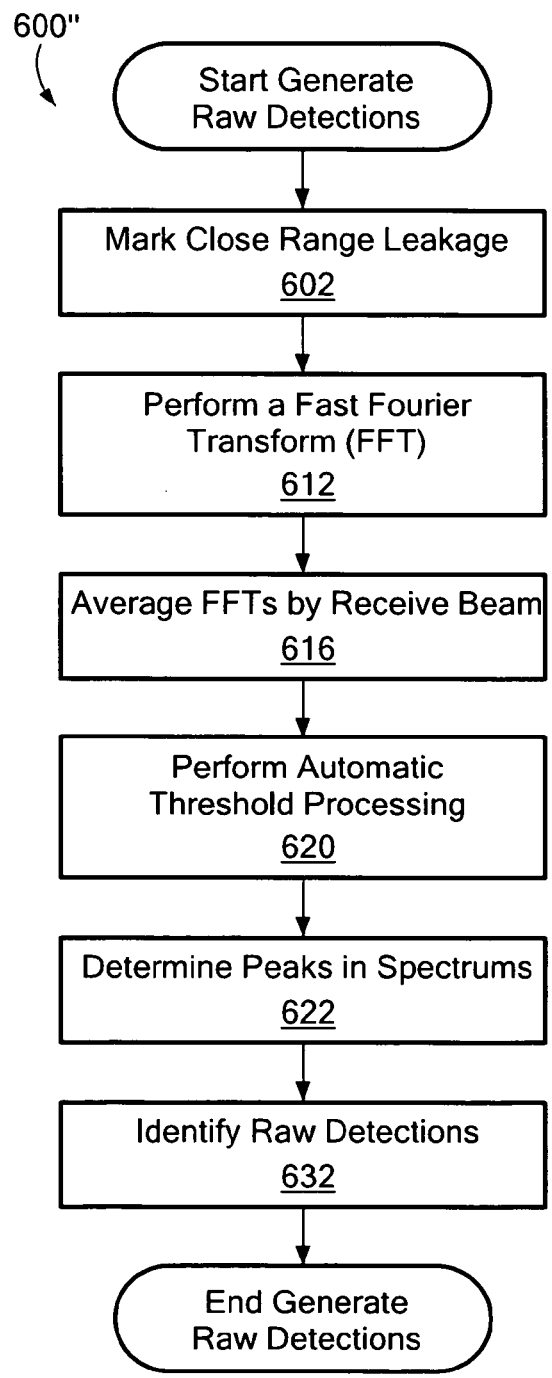
FIG. 6B
FIG. 6C

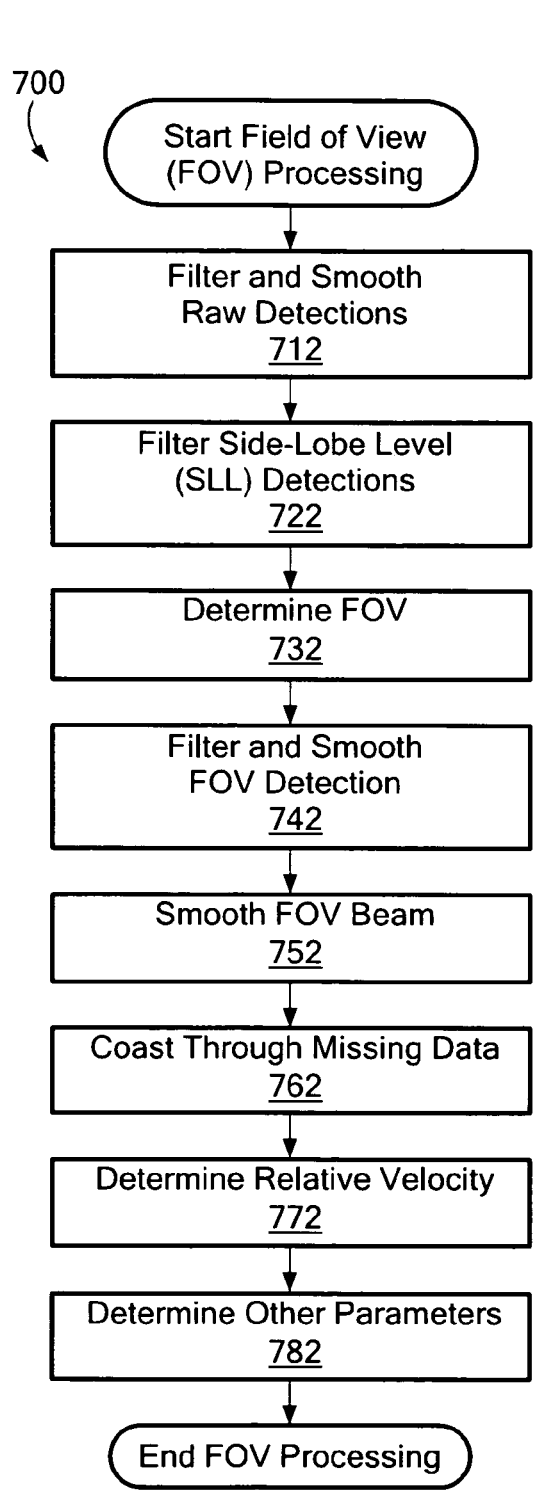
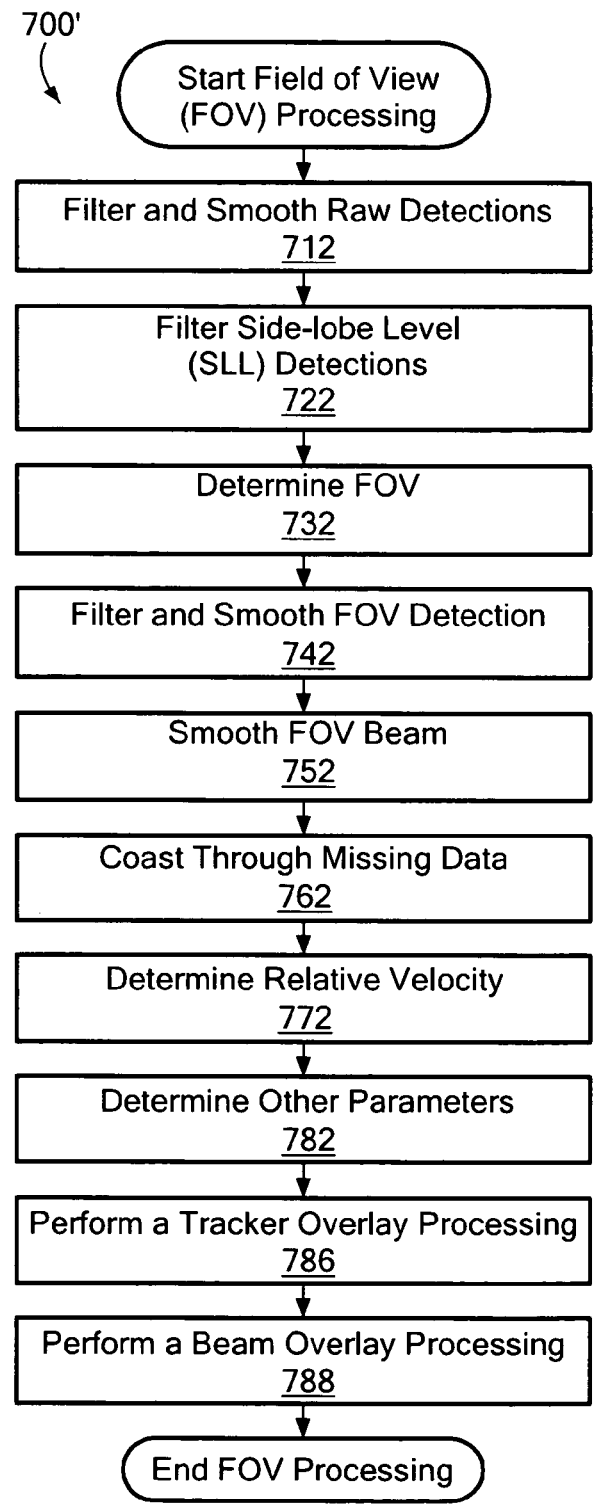
*FIG. 7A*  *FIG. 7B*

| Time | $t_1$ | $t_2$ | $t_3$ | $t_4$ | $t_5$ | $t_6$ |
|---|---|---|---|---|---|---|
| In-Zone Latch | 0 | 1 | 1 | 0 | 1 | -1 |
| Closing Latch | 1 | 1 | 1 | 1 | 0 | 0 |
| Alert Latch | 0 | 1 | 1 | 1 | 1 | 0 |

| Time | $t_1$ | $t_2$ | $t_3$ | $t_4$ | $t_5$ | $t_6$ |
|---|---|---|---|---|---|---|
| In-Zone Latch | 0 | 1 | 1 | 1 | 1 | -1 |
| Closing Latch | 1 | 1 | 1 | 0 | 0 | 0 |
| Alert Latch | 0 | 1 | 1 | 1 | 1 | 0 |
| Beam | 22b | 22e | 22d | 22d | 22d | 22d |
| Range (Meters) | 2.9 | 2.7 | 2.5 | 2.5 | 2.5 | 2.5 |

SYSTEM AND METHOD FOR GENERATING AN ALERT SIGNAL IN A DETECTION SYSTEM

CROSS REFERENCE TO RELATED APPLICATIONS

This application claims the benefit of International Patent Application PCT/US2007/023019 filed Oct. 31, 2007, published in the English language as WO2008/063367, which application claims priority from U.S. Provisional Patent Application No. 60/863,663, filed on Oct. 31, 2006.

BACKGROUND

As is known in the art, one problem with detection systems is the generation of reliable alert signals. In particular, when multiple objects (or targets) are present in a field of view of a detection system, it is difficult to identify the most significant target and to reliably generate an alert signal in the presence of noise and other targets in the field of view.

It would, therefore, be desirable to provide a system and technique for reliably generating an alert signal.

SUMMARY

The invention relates to a system and method for generating an alert signal, and more particularly, to generating an alert signal in a detection system such as an automotive radar system.

In one embodiment, a system and method of generating alert signals in a detection system, includes comparing data extracted from signals received from receive beams with stored scenarios and determining whether to generate an alert signal based upon the results of the compare operation. In one embodiment for an automotive radar system, the stored scenarios include but are not limited to: a pass-from-the-rear scenario, a stagnation scenario, a side-merge scenario, a corridor scenario and a convoy scenario. In one embodiment, the comparison of data extracted from received signals with stored scenarios includes is accomplished by using one or more latches to process the extracted data from the received signals. The data may correspond, for example, to range data, velocity data and receive beam data. In one embodiment, raw detections are obtained by performing a fast Fourier Transform (FFT) on the received signals, determining peaks from the FFT and identifying raw detections.

In one embodiment the raw detections are pre-processed to generate so-called field of view (FOV) products. Examples of FOV products include, but are not limited to, relative velocity and other parameters. The FOV products are then provided to a tracker which performs tracker overlay processing and beam overlay processing.

In another embodiment, rather than pre-process the raw detections, the raw detections are instead provided directly to a tracker which process the raw detections to provide products including, but not limited to, relative velocity and other parameters. In addition to producing the products, the tracker also performs its usual functions and provides its usual outputs (e.g. performing a tracker overlay processing and performing a beam overlay processing).

In one embodiment, the FFT data is averaged by the receive beams. In one embodiment, the raw detections are filtered and smoothed, antenna side-lobe detections are filtered, field of view detections are determined and field of view detections are filtered and smoothed. In one embodiment, determining a field of view detection includes determining a closest detection to a receiver. In one embodiment, the system and method mask close-range leakage and perform automatic threshold processing.

In one embodiment, regardless of how the parameters are generated (e.g. providing raw detections directly to a tracker or by pre-processing the raw detections and providing products to a tracker), the system performs first and second scenario processing using the parameters. In this embodiment, the system determines if an alert signal should be sent based upon the first scenario processing and the second scenario processing and/or the parameters and if so, the system sends an alert signal.

DESCRIPTION OF THE DRAWINGS

FIG. 5 is a flowchart of an example of a process to generate an alert signal.

FIGS. 6A, 6B and 6C are flowcharts of examples of processes to generate raw detections.

FIGS. 7A and 7B are flowcharts of examples of processes to perform field of view (FOV) processing.

DETAILED DESCRIPTION

Described herein is an approach for generating an alert signal in a detection system. While the techniques described herein are described as used in a vehicle radar system (a/k/a an automotive radar system), the techniques may be used in any detection system, either fixed or mobile. Hence, the techniques described herein are not dependent upon any specific hardware configuration. Rather, as will be seen below, the techniques may receive input data from any detection system not just a radar system.

Figure 1:
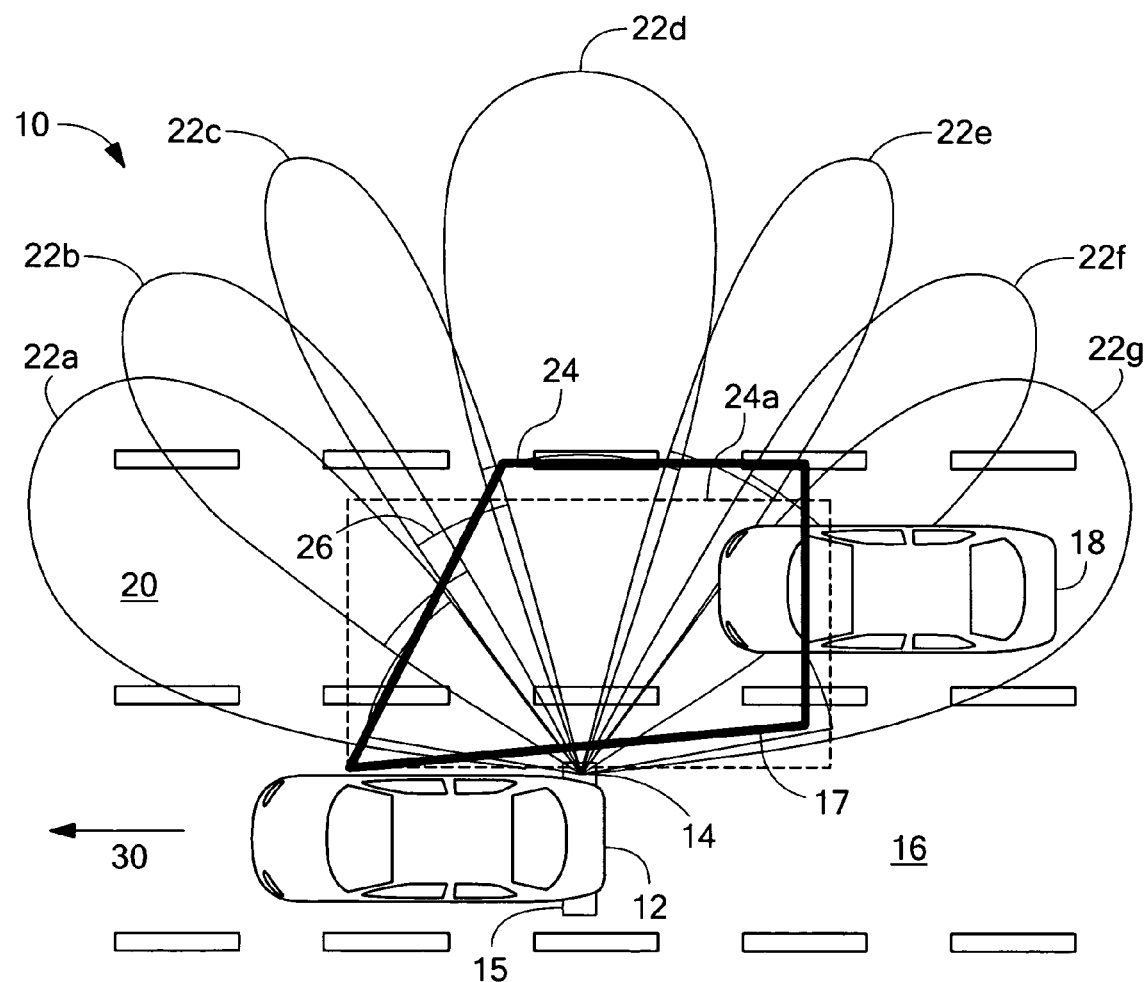
FIG. 1 is a diagrammatic view of a pair of vehicles traveling along a roadway.

Referring to FIG. 1, a first vehicle 12 traveling in a first traffic lane 16 of a road includes a side-object detection (SOD) system 14. The SOD system 14 is disposed on a side portion of the vehicle 12 and in particular, the SOD system 14 is disposed on a right rear quarter of the vehicle 14. The vehicle 12 also includes a second SOD system 15 disposed on a side portion of a left rear quarter of the vehicle 12. The SOD systems 14, 15 may be coupled to the vehicle 12 in a variety of ways. In some embodiments, the SOD systems may be coupled to the vehicle 12 as described in U.S. Pat. No. 6,489,927, issued Dec. 3, 2002, which is incorporated herein by reference in its entirety. A second vehicle 18 travels in a second traffic lane 20 adjacent the first traffic lane 16. The first and second vehicles 12, 18 are both traveling in a direction 30 and in the respective first and second traffic lanes 16, 20.

The second vehicle 18 may be traveling slower than, faster than, or at the same speed as the first vehicle 12. With the relative position of the vehicles 12, 18 shown in FIG. 1, the second vehicle 18 is positioned in a "blind spot" of the first vehicle 12. In general, a blind spot is an area which an operator of a vehicle (e.g. vehicle 12) is unable to see. This may be, for example, an area located on a side of the first vehicle 12. In the exemplary embodiment of FIG. 1, the operator of the first vehicle (i.e. vehicle 12) is unable to see the second vehicle (i.e. vehicle 18) either through side-view mirrors 84, 86 (see FIG. 2) or a rear-view mirror (not shown) of the first vehicle 12.

The SOD system 14 generates multiple receive beams (e.g., a receive beam 22a, a receive beam 22b, a receive beam 22c, a receive beam 22d, a receive beam 22e, a receive beam 22f and a receive beam 22g) which detect objects in an associated detection zone 24. The shape of the detection zone 24 is formed by the SOD system 14 by selection of maximum detection ranges associated with each one of the receive beams 22a-22g. In the exemplary embodiment of FIG. 1, for example, the maximum detection ranges of each of beams 22a-22g are selected to provide a detection zone such as detection zone 24 having a desired shape. For example, beam 22c has a maximum detection range associated therewith which is designated by reference line 26. Each of the beams 22a-22g may also have a minimum detection range (not shown), forming an edge 17 of the detection zone 24 closest to the first vehicle.

In one particular embodiment, the SOD system 14 is a frequency modulated continuous wave (FMCW) radar, which transmits continuous wave chirp radar signals, and which processes received radar signals accordingly. In some embodiments, the SOD system 14 may be the same as or similar to the type described, for example, in U.S. Pat. No. 6,577,269, issued Jun. 10, 2003; U.S. Pat. No. 6,683,557, issued Jan. 27, 2004; U.S. Pat. No. 6,642,908, issued Nov. 4, 2003; U.S. Pat. No. 6,501,415, issued Dec. 31, 2002; and U.S. Pat. No. 6,492,949, issued Dec. 10, 2002, which are all incorporated herein by reference in their entirety.

In operation, the SOD system 14 transmits a radio frequency (RF) signal. Portions of the transmitted RF signal impinge upon and are reflected from objects in the path of the transmitted signal such as the second vehicle 18. The reflected signals (also referred to as "echo" signals) are received in one or more of the receive beams 22a-22g. Other ones of the radar beams 22a-22g, which do not receive the echo signal from the second vehicle 18, receive and/or generate other radar signals, for example, noise signals. As used herein, the term "noise signal" is used to describe a signal comprised of one or more of a thermal noise signal, a quantization noise signal, a crosstalk signal (also referred to as leakage or feed through signal), and an ambient RF noise signal.

In some embodiments, the SOD system 14 may transmit RF energy in a single broad transmit beam (not shown). In other embodiments, the SOD system 14 may transmit RF energy in multiple transmit beams (not shown), for example, in seven transmit beams associated with the receive beams 22a-22g. In still other embodiments, the SOD system may transmit RF energy in multiple transmit beams and receive return signals in a single receive beam.

In operation, the SOD system 14 may process the received radar signals associated with each one of the beams 22a-22g in sequence, in parallel, or in any other time sequence. The SOD system 14 identifies an echo signal associated with the second vehicle 18 when any portion of the second vehicle 18 is within the detection zone 24. Therefore, the SOD system 14 is adapted to detect the second vehicle 18 when at least a portion of the second vehicle is in or near the blind spot of the first vehicle 12.

Figure 2:
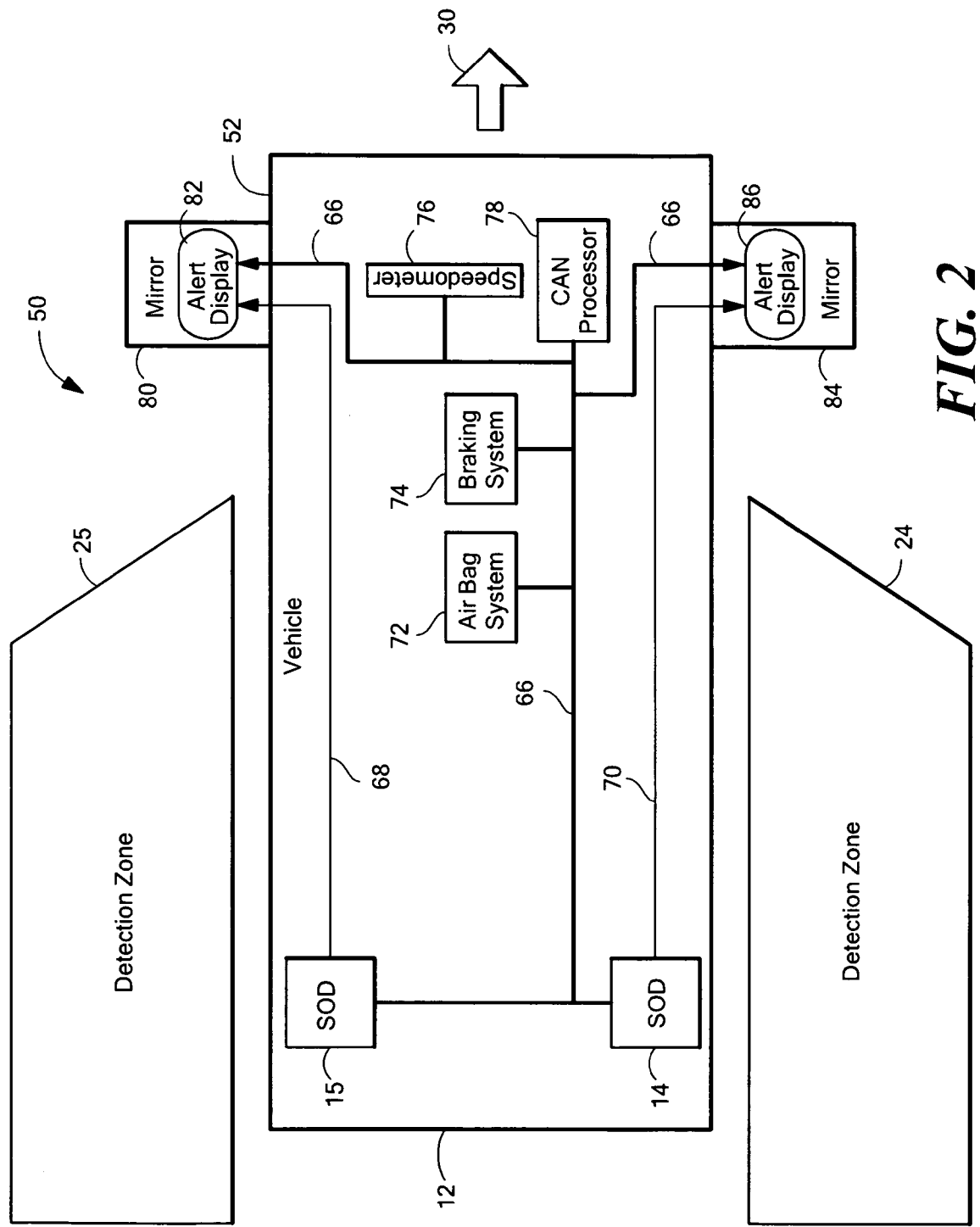
FIG. 2 is a block diagram of a vehicle system architecture.

Referring to FIG. 2, an exemplary vehicle system 50 which may be the same as or similar to the vehicle systems included in vehicles 12, 18 described above in conjunction with FIG. 1, includes vehicle systems such as SOD systems 14, 15, an air bag system 72, a braking system 74, and a speedometer 76.

Each one of the SOD systems 14, 15 is coupled to a Controller Area Network (CAN) processor 78 through a Controller Area Network (CAN) bus 66. As used herein, the term "controller area network" is used to describe a control bus and associated control processor typically found in vehicles. For example, the CAN bus 66 and associated CAN processor 78 may control a variety of different vehicle functions such as anti-lock brake functions, air bags functions and certain display functions.

The vehicle 12 includes two side-view mirrors 80, 84, each having an alert display 82, 86, respectively, viewable therein. Each one of the alert displays 82, 86 is adapted to provide a visual alert to an operator of a vehicle in which system 50 is disposed (e.g., vehicle 12 in FIG. 1) to indicate the presence of another vehicle in a blind spot of the vehicle. To this end, in operation, the SOD system 14 forms detection zone 24 and SOD system 15 forms a detection zone 25.

Upon detection of an object (e.g., another vehicle, a guard rail, a tree, a building and so forth) in the detection zone 24, the SOD system 14 sends an alert signal indicating the presence of an object to either or both of the alert displays 82, 86 through the CAN bus 66. In response to receiving the alert signal, the alert displays provide an indication through an indicator (e.g., a visual, audio, or mechanical indicator) which indicates the presence of an object. Similarly, upon detection of an object in the detection zone 25 SOD system 15 sends an alert signal indicating the presence of another vehicle to one or both of alert displays 82, 86 through the CAN bus 66. However, in an alternate embodiment, the SOD system 15 may communicate the alert signal to the alert display 82 through a human/machine interface (HMI) bus 68. Similarly, SOD system 14 may communicate the alert signal to the other alert display 86 through another human/machine interface (HMI) bus 70. As used herein an alert signal may include an alert signal to turn on an alert or an alert signal to turn off an alert. As will described below, the mere detection or lack of detection of an object in the detection zone 24, 25 may not necessarily generate an alert signal. Other circuitry and/or program code logic may be implemented within or external to the SOD to ensure that the alert signal is sent when certain criteria are met based upon the data received at the receiver 158 (see, for example, FIGS. 5 to 12).

Figure 3:
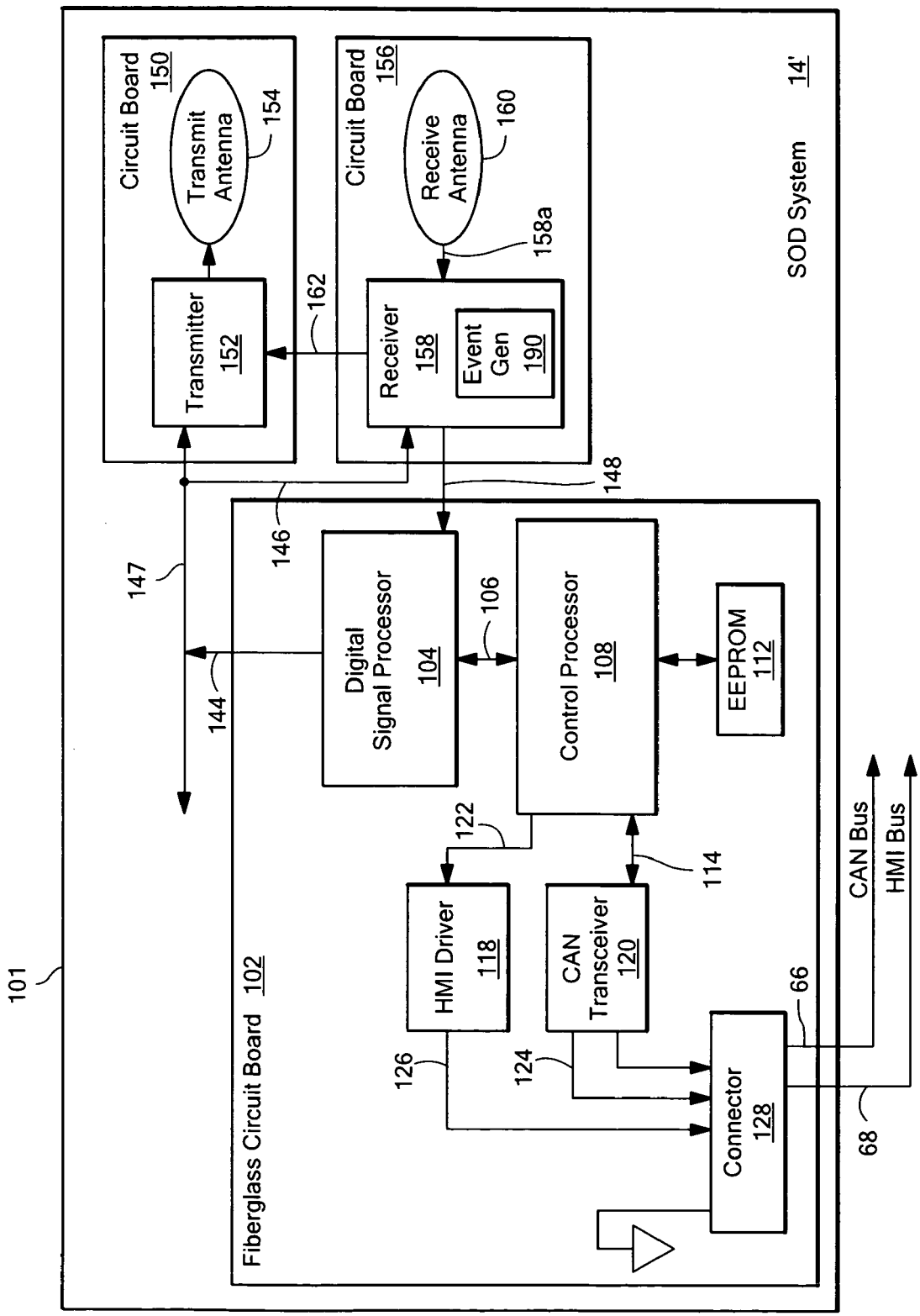
FIG. 3 is a block diagram of a vehicle radar system.

Referring to FIG. 3, a SOD system 14' which may be the same as or similar to SOD 14 described above in conjunction with FIGS. 1 and 2, includes a housing 101 having a plurality of circuit boards 102, 150, 156 disposed therein. The particular type of material from which each circuit board is provided can be selected to satisfy all circuit performance and cost requirements. For example, circuit board 102 may be provided as a fiberglass circuit board; circuit board 150 may be provided as a low temperature co-fired ceramic (LTTC) circuit board or as a polytetrafluoroethylene (PTFE) circuit board 150; and circuit board 156 may be provided as an LTCC circuit board 156. Other materials may, of course, also be used for each circuit board as long as circuit performance and cost criteria are satisfied. Those of ordinary skill in the art will understand how to select a particular material for each circuit board depending upon a variety of factors including but not limited to technical (e.g., engineering) requirements and cost.

The circuit board 102 has disposed thereon a digital signal processor (DSP) 104 coupled to a control processor 108. In general, the DSP 104 is adapted to perform signal processing functions, for example, fast Fourier transforms (FFTs) on signals provided thereto from the receiver. In some embodiments, the DSP 104 may be of a type described, for example, in U.S. patent application Ser. No. 11/102,352, filed Apr. 8, 2005 which is incorporated herein by reference in its entirety. The control processor 108 is adapted to perform digital functions, for example, to identify conditions under which an operator of a vehicle on which the SOD system 14 is mounted should be alerted to the presence of another object such as a vehicle in a blind spot.

The control processor 108 is coupled to a memory 112 which is here illustrated as an electrically erasable read-only memory (EEPROM) 112. Memory 112 is adapted to retain a variety of values including but not limited to calibration values. Other read only memories associated with processor program memory are not shown for clarity. The control processor 108 is coupled to a CAN transceiver 120, which is adapted to communicate, via a connector 128, on the CAN bus 66.

The control processor 108 is coupled to an optional human/machine interface (HMI) driver 118, which may communicate via the connector 128 to the HMI bus 68. The HMI bus 68 may include any form of communication media and communication format, including, but not limited to, a fiber optic media with an Ethernet format, and a wire media with a two state format.

The circuit board 150 includes a radar transmitter 152 coupled to a transmit antenna 154. Transmitter 152 is also coupled to DSP 104 through an interface 147 and a bus 144. In one embodiment, the interface 147 is provided as a serial port interface (SPI) 147.

The circuit board 156 includes a receive antenna 160 coupled to a receiver 158. Receiver 158 is, in turn, coupled to the DSP 104 and to the transmitter 152. In some embodiments, the receiver 158 is coupled to the DSP 104 through a bus 146 which is coupled to interface 147 which in turn is coupled to bus 144 through the SPI 147 and a bus 146. The radar transmitter 152 and the radar receiver 158 may receive regulated voltages from a voltage regulator. The receiver 158 also provides RF signals to the transmitter 152 through a signal path 162.

In operation, the DSP 104 initiates one or more chirp control signals (also referred to as ramp signals) by providing a command signal to an event generator 190 via signal path 148. In response to the command signal from the DSP, the event generator 190 generates the chirp control signals. Thus, the event generator removes the chirp control signal processing function from the DSP 104. In the embodiment of FIG. 3, the chirp generator is located in the receiver 158. In other embodiments, however, the event generator 190 can be located in other portions of the radar system 14' (FIG. 3).

It should be understood that by removing the control signal waveform responsibility from the DSP 104 and providing a dedicated event generator circuit which is separate from the DSP, the event generator may provide more comprehensive chirp control signals. This is because the DSP 104 must serve multiple and differing types of requests while the event generator serves only to generate control signals related to generation of the chirp control signals. Also, the required accuracy of the timing signals created by the event generator also precludes the event generator from being the direct responsibility of the DSP 104. Also, the DSP 104 is now freed from this time consuming activity, so it can now perform additional critical tasks in parallel.

Each chirp control signal has a start voltage and an end voltage. The chirp control signal is provided to a signal source. In response to the ramp signals, the signal source generates RF signals having waveform and frequency characteristics determined or controlled by the chirp control signal. The transmitter feeds the RF signals to the transmit antenna 154 which emits (or radiates) the RF signals as RF chirp radar signals. As used herein, the term "chirp" is used to describe a signal having a characteristic (e.g., frequency, amplitude, or any other characteristic or combinations of any characteristics) that varies with time during a time window. Typically, in those instances when the frequency of the signal is varied, each chirp has an associated start and end frequency. A chirp may be a linear chirp, for which the frequency varies in a substantially linear fashion between the start and end frequencies. The chirp may also be a non-linear chirp.

The DSP 104 initiates transmission of ramp signals by the event generator 190 for so-called major cycles. The DSP 104 causes the event generator to execute a pre-programmed set of actions, which will cause a signal source (e.g., a VCO) to be modulated accordingly, for each minor cycle in turn. A major cycle is a time period during which signals are received in a designated set of the receive beams 22a-22g. The designated set of receive beams may be all of the receive beams 22a-22g or the designated set of receive beams may be only some of the receive beams 22a-22g. A major cycle is comprised of one or more so-called minor cycles. A minor cycle is a period of time during which signals are received in a subset of the designated set of receive beams.

As mentioned above and as will be described herein further below, the DSP 104 causes the event generator 190 (FIG. 4) to execute for each minor cycle. Thus, for each major cycle, the DSP issues a so-called "go" command several times per major cycle. The event generator 190 (FIG. 4), in turn, provides controls signals or values in each minor cycle including the transmission of the ramp control signals (or more simply "ramp signals") in each minor cycle.

The transmit antenna 154 may be provided having one or a plurality of transmit beams. Regardless of the number of transmit beams, the transmit antenna 154 emits one or more RF chirp radar signals in a desired field of views (e.g., summed or individually covering the detection zone 24 in FIG. 1). The transmit beams may be similar or different in antenna pattern and may be similar or different in fields of view. Their fields of view may overlap to varying extents, from completely overlapped to not at all overlapped.

The receive antenna system 160 may be provided having one or a plurality of receive beams. The receive beams may be similar or different in antenna pattern and may be similar or different in fields of view. Like the transmit beams, the fields of view of the receive beams may overlap to varying extents, from completely to not at all. The SOD 14 in FIG. 1, for example, utilizes seven receive beams 22a-22g. Each of the receive beams receives return or echo radar signals, or otherwise generates and/or receives noise signals. Signals received through the receive beams are directed to the radar receiver 158. The radar receiver 158 receives the signals provided thereto from the antenna, down converts the received RF signals to an intermediate frequency (IF) signal, and provides an output signal on signal path 148. In addition to the frequency down conversion, the receiver 158 appropriately processes the RF input signals provided thereto from the receive antenna system 160 such that the output signals on the signal path 148 can be appropriately received and processed by the DSP 104.

The signal provided to the input of DSP 104 has a frequency content, wherein signal level peaks which occur at different frequencies correspond to detected objects at different ranges. The DSP 104 analyzes the signals provided thereto and identifies objects in the detection zone 24 or 25.

Some objects identified by the DSP 104 may be objects for which an operator of the first vehicle 12 (FIG. 1) has little concern and need not be alerted. For example, an operator of vehicle 12 may not, in some instances, need to be alerted or continuously alerted as to the existence of a stationary guardrail along the roadside. Thus, criteria additional to the presence of an object in or near the detection zone may be used to determine when an alert signal should be generated or terminated.

To utilize further criteria, the control processor 108 receives object detections on a bus 106 from the DSP 104. The control processor 108 applies a series of factors and characteristics (i.e., criteria used in addition to that used by DSP 104 to identify an object) to control generation of an alert signal. For example, upon determination by the control processor 108, the alert signal may be generated and sent through a bus 114 to CAN transceiver 120 and communicated on the CAN bus 66, which is indicative not only of an object in the detection zone 24, but also is indicative of an object having predetermined characteristics being in the detection zone. In other embodiments, an alert signal may be communicated by control processor 108 on a bus 122 through the HMI driver 118 to the HMI bus 68.

The circuit board 102, the circuit board 150, and the circuit board 156 are comprised of materials having known behaviors for signals within particular frequency ranges. It is known, for example, that fiberglass circuit boards have acceptable signal carrying performance at signal frequencies up to a few hundred MHz. LTCC circuit boards and PTFE circuit boards are known to have acceptable signal carrying performance characteristics at much higher frequencies. Thus, in the case where circuit board 102 is provided as a fiberglass circuit board and circuit boards 150, 156 are provided from LTCC and/or PTFE, circuits and circuitry which perform the lower frequency functions of the SOD system 14 are disposed on the circuit board 102, while circuits and circuitry which perform the functions having relatively high frequencies (e.g. above approximately 2 GHz) are disposed on the LTCC and on the PTFE circuit boards 150, 156, respectively. Nevertheless suitable materials other than those specifically mentioned herein may of course, also be used.

Figure 4:
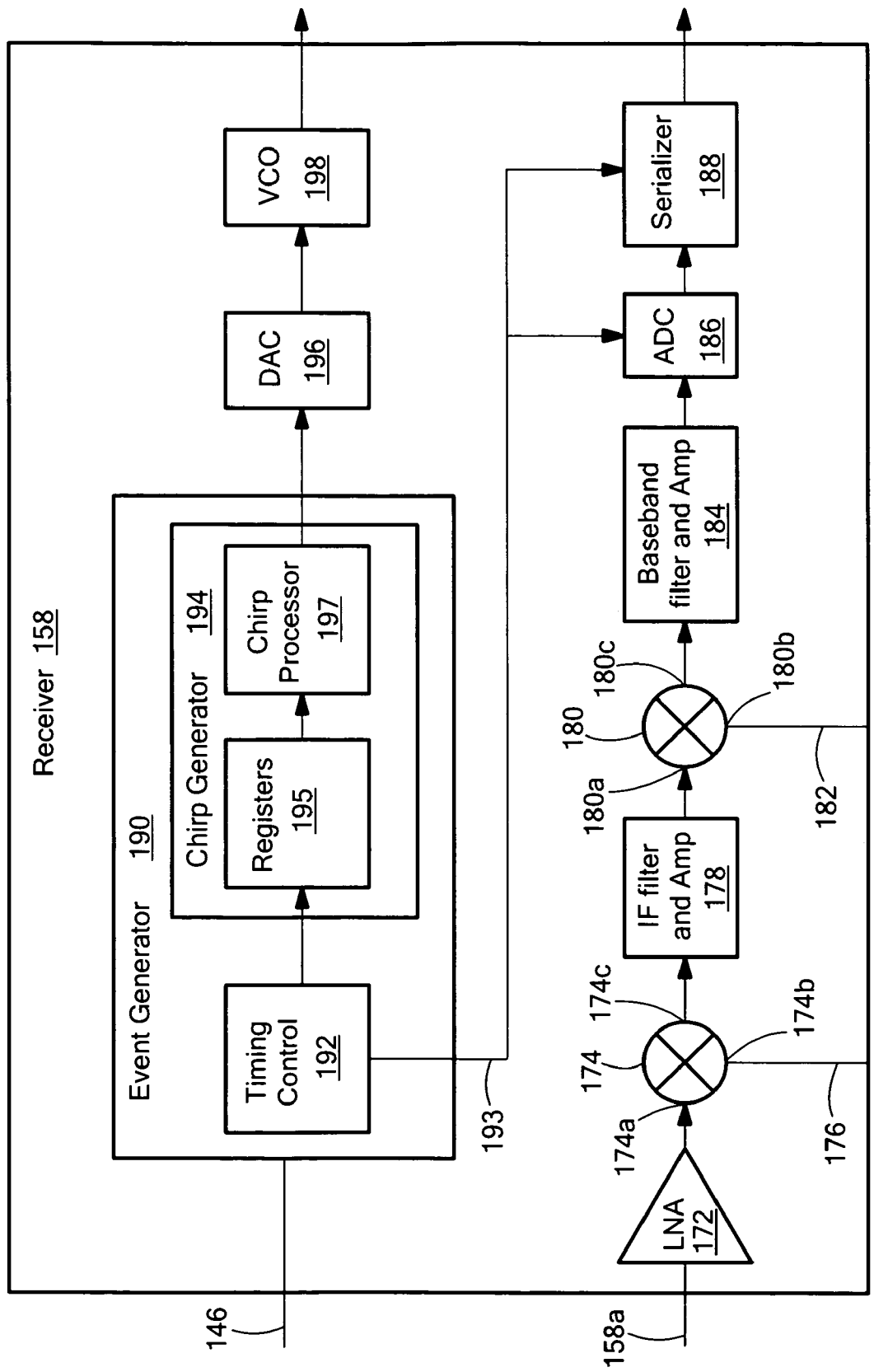
FIG. 4 is a block diagram of a receiver.

Referring to FIG. 4, the receiver 158 includes an RF low-noise amplifier (LNA) 172, a first frequency down converter circuit (or mixer) 174, an intermediate frequency (IF) filter and amplifier circuit 178, a second frequency down converter circuit (or mixer 180), a baseband filter and amplifier circuit 184, an analog-to-digital converter (ADC) 186 and a serializer 188. An RF signal received through antenna 160 (FIG. 3) is provided to receiver input 158a and subsequently to an input of the RF LNA 172. The RF LNA 172 provides an amplified version of the signal fed thereto to a first input port 174a of the mixer 174. An RF signal fed along signal path 176 to a second port 174b of the mixer 174 serves as a first local oscillator (LO) signal. Illustrative frequencies for the RF signals from the amplifier 172 and the first LO signal are on the order of 24 GHz and 17 GHz respectively. Mixer 174 receives the RF and the first LO signals provided thereto and provides a down-converted or intermediate frequency (IF) signal at a third port 174c thereof.

The down-converted signal is fed from the third port 174c of the mixer 174 to an IF filter and amplifier circuit 178. The IF filter and amplifier circuit 178 provides a suitably filtered and amplified version of the down-converted signal fed thereto to a first input port 180a of the second mixer 180. An RF signal is fed along a signal path 182 to a second port 180b of the mixer 180 and serves as a second LO signal. Illustrative frequencies for the RF signals from the filter and amplifier circuit 178 and the LO signal are on the order of 6 GHz. Although the exemplary receiver 158 is shown as a direct conversion, dual heterodyne receiver, other receiver topologies may also be used in the SOD system 14. Mixer 180 receives the RF and LO signals provided thereto and provides a second down converted or IF signal at a third port 180c thereof to an input port of a baseband filter and amplifier circuit 184. The baseband filter and amplifier circuit 184 provides a suitably filtered and amplified signal to an input of an analog-to-digital converter (ADC) 186.

The ADC 186 receives the analog signal fed thereto from filter and amplifier circuit 184 and converts the analog signal into digital signal samples which are serialized by a serializer 188 for further processing. In particular, the digital signal samples are coupled from the serializer 188 to a DSP (e.g., DSP 104 in FIG. 3) which processes the signals fed thereto to determine the content of the return signal within various frequency ranges.

The event generator 190 includes a timing and control circuit 192 and a chirp generator 194. In general, the event generator 190 operates as a state machine by receiving input values from DSP 104 and transmitter 152 (which are loaded into registers 195, for example) and in response to the input values, providing output values. Event generator 190 controls VCO 198 by sending control signals from the chirp processor 197 through the DAC 196 to the VCO 198. It should be understood that in the embodiment of FIG. 4, since the signal source which generates RF signals to be eventually transmitted via an RF transmit path of the radar is a VCO, then the control signals provided by the event generator to the VCO are provided as voltage control signals with the VCO responsive to the signal level (e.g., voltage level) of the voltage control signal. If the signal source were responsive to other types of signals or other types of signal characteristics (e.g., current signals rather than voltage signals or pulse repetition frequencies rather than signal level), then event generator 190 would provide a suitable control signal. In some embodiments, the VCO 198 may be of a type described, for example, in U.S. Pat. No. 6,577,269, issued Jun. 10, 2003, which is incorporated herein by reference in its entirety.

The event generator 190 also controls processing of digital samples from the serializer 188 by sending a control signal from the timing control circuit 192 to the ADC 186 and/or the serializer 188. As indicated above, the digital processor 104 initiates processing of a major cycle while the event generator 190 controls the minor cycles which allows DSP 104 to perform other functions such as detection processing.

The chirp generator 194 includes a plurality of registers generally denoted 195, and a chirp processor 197. Some of the registers 195 may be assigned to receive compensation values (e.g., in the form of slope information) which are used to compensate for any non-linearity in the VCO 198.

Other ones of the registers 195 can hold values for controlling other parameters for forming chirp waveforms. For example, the parameters may include time delays between chirp waveforms, a start voltage for each chirp waveform, a number of chirp waveforms for each minor cycle and a type of chirp waveform. The register 195 may also be configured so that a register corresponds to a parameter. For example, one of the registers 195 can receive a single value which controls the number of chirp waveforms used in a minor cycle and a different one of the registers can receive a single value which controls the type of chirp waveform in each chirp period. Alternatively, the registers 195 may be configured so that a single value (parameter) loaded into the register 195 defines multiple parameters (e.g., a single value defines both the number of chirp waveforms and the type of chirp waveforms in a minor cycle or multiple minor cycles).

It should thus be appreciated that there is a correspondence between the number of registers 195 designated as slope registers and the number of segments in the ramp signal. The particular number of registers designated as slope registers to use in any particular application is based upon a variety of factors including but not limited to the expected nonlinearity in the slope of the ramp signal. It should be understood that the total linear accuracy of the ramp waveform is affected by the total number of segments the Event Generator can control. Each individual linear segment is fit into a non-linear curve. The larger the number of segments, the more accurate the final result will be.

In one embodiment, the chirp processor 197 may include an adder mechanism that adds a slope value to the previous sum from one of the registers 195. The adder is used to create the ramp waveform over time. The VCO is connected to the digital to analog converter 196 which provides signals to modulate the VCO output as directed by the event generator. To generate the ramp waveform, the start value register is first loaded into one of the adder's operand registers. Then, the start value is added to the first slope register value to create the next step on the ramp waveform. The adder continues to increase the value to the D/A converter for up-chirps (or decrease the value on down chirps) on each subsequent add, until the first segment is complete. This process is then repeated for the other 7 segments.

FIGS. 5-8C are a series of flow diagrams which illustrate processes which can be implemented and/or performed by apparatus such as SOD 14 (FIG. 1) to generate alert signals. Rectangular elements (typified by element 503 in FIG. 5), are herein denoted "processing blocks," and represent computer software instructions or groups of instructions Alternatively, the processing blocks can represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of blocks described is illustrative only and can be varied without departing from the spirit of the invention. Thus, unless otherwise stated the blocks described below are unordered meaning that, when possible, the steps can be performed in any convenient or desirable order.

Figures 5, 6A:
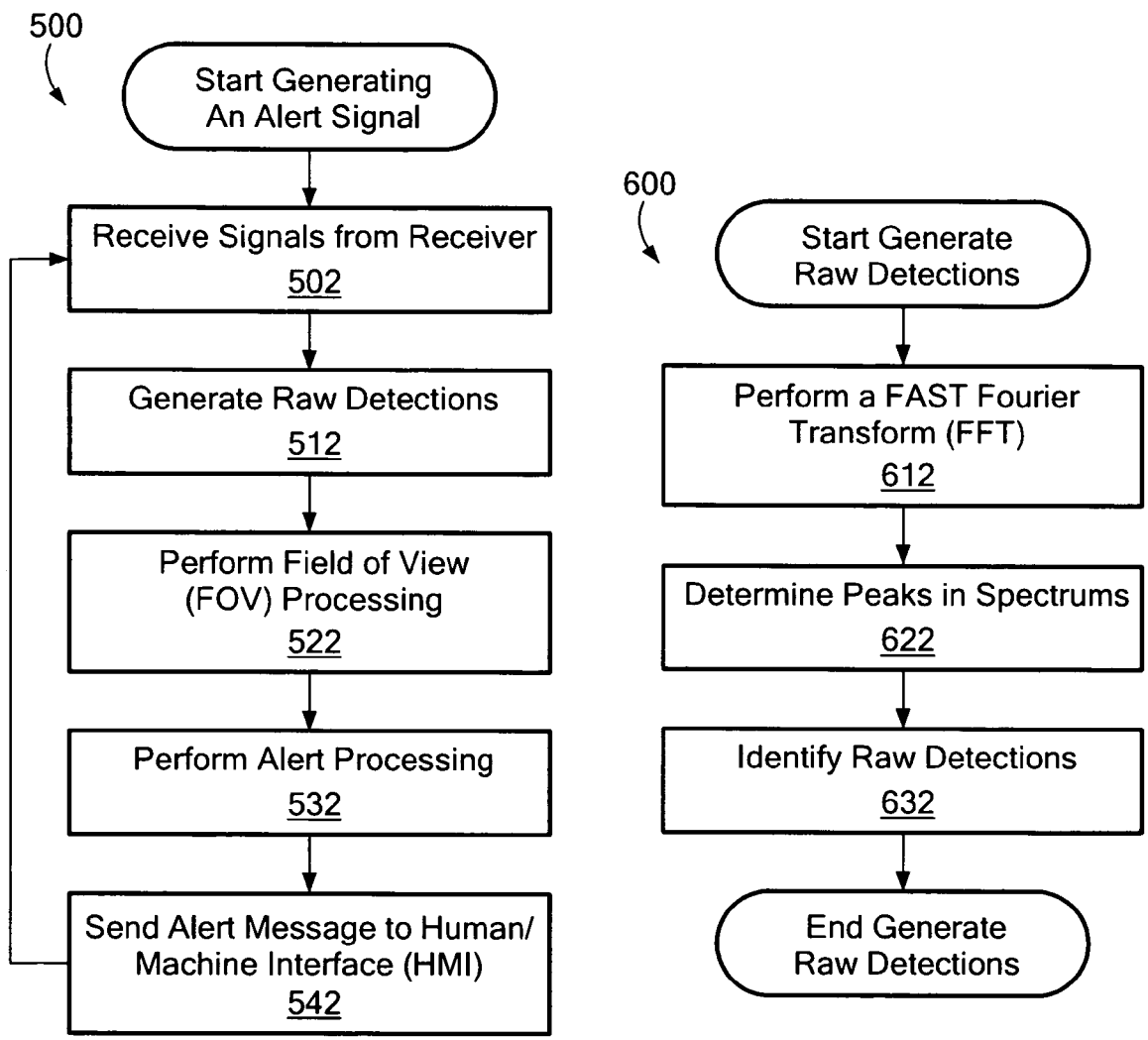

Turning now to FIG. 5, an example of a process 500 to generate an alert signal begins in processing block 502 in which a receiver of a radar system provides frequency downconverted output signals to a processing element.

In the embodiment of FIG. 3, for example, the receiver 158 provides signals to the DSP 104 through the signal path 148. In one example, the DSP 104 receives a predetermined number of points (e.g. 256 points) of video detections representing one chirp per beam dwell (a minor cycle) for each of the seven received beams 22a-22g (a major cycle).

Processing then proceeds to processing block 504 in which possible object locations are identified. This may be accomplished, for example, by setting a threshold value and identifying all detections above the threshold value as possible object locations. In a preferred embodiment, the detections are compared to the threshold value prior to nay filtering or other processing and thus the object locations (i.e. they are so-called "raw detections") are generated from the receiver signals. Exemplary techniques for generating raw detections are provided below in conjunction with FIGS. 6A-6C.

In a system such as that described above in conjunction with FIGS. 3 and 4, for example, the DSP 104 generates a range and magnitude of the first three detections closest in range to the SOD system 14. In one example, DSP 104 uses executable instruction code stored within a memory (not shown) in the DSP 104 to perform the functions illustrated in processing block 512.

Once the raw detections are generated, processing then proceeds to processing block 522 in which so-called field of view (FOV) processing is performed. To perform FOV processing, the raw detections generated in processing block 512 are considered and the first detection regardless of beam is identified. This approach is used since it has been found that the closest object is often the object of primary interest. Also, this technique is efficient in terms of program code resources and memory resources and processing resources and time since it can be done in the system's native coordinate system (e.g. beam number and range). It is not necessary to transform data into an x-y coordinate system or any other coordinate system. In one embodiment, three raw detections for each beam can be generated and then a determination is made in the FOV processing as to which detection is closest.

In a system such as that described above in conjunction with FIGS. 3 and 4, for example, the control processor 108 receives the raw detections from the DSP 104 through the signal path 106 and performs additional processing on the raw detections to filter and smooth the raw detections and to generate parameters such as smooth range, smooth beam (also known as angle), velocity data (also known as range rate and which can be determined from the smoothed, range data to be used in the alert processing block 532. In one example, the control processor 108 uses executable instruction code stored within a memory (not shown) in the control processor 108 to perform the operation illustrated in processing block 522. In one embodiment, the operation of processing block 522 may be performed multiple times in parallel for every received beam 22a-22g individually.

Once the raw detections have been generated and the FOV processing has been performed, then as shown in processing block 532, alert processing is performed. Several exemplary alert processing techniques will be described below in conjunction with FIGS. 8A-8C, in general however, one or more parameters provided from the FOV processing are utilized in a decision matrix having a tree structure in which the parameters are concurrently provided to multiple decision branches In a system such as that described above in conjunction with FIGS. 3 and 4, for example, the control processor 108 uses the parameters to perform alert processing to generate an alert signal (e.g., an alert message to turn on an alert, an alert message turn off an alert and so forth). For example, the control processor 108 uses the smooth range, smooth beam and velocity data along with past smooth range, smooth beam and velocity data to determine whether to generate the alert signal. In one example, the control processor 108 uses executable instruction code stored within a memory (not shown) in the control processor 108 to perform processing block 532.

Process 500 sends an alert message (542). For example, the control processor 108 sends an alert message to either or both of the alert displays 82, 86 through the CAN bus 66 (FIG. 2).

In another example, the control processor 108 sends the alert message to the alert display 86 through the HMI bus 70 (FIG. 2).

Referring to FIG. 6A, an example of a process to determine the raw detections is a process 600. Process 600 performs a Fast Fourier Transform (FFT) (612). For example, the DSP 104 performs the FFT on a signal received from the receiver 158. In one example, the received signal is zero-padded to 512 points, one spectrum per receive beam 22a-22g.

Process 600 determines peaks in spectrums (622). For example, the DSP 104 determines peaks in a spectrum above a beam threshold for each beam 22a-22g.

Process 600 identifies the raw detections (632). For example, the DSP 104 determines range and magnitude of n detections closest in range to the SOD system 14. In one example, n=3.

Referring to FIG. 6B, in another embodiment, a process 600' may also be implemented to determine raw detections. For example, the process 600' includes the same processing blocks as process 600 with an additional processing block 616 added after processing block 612. The processing block 616 averages FFTs by receive beam over more than one major cycle.

Referring to FIG. 6C, in another embodiment, a process 600" may also be implemented to determine raw detections. For example, the process 600" includes the same processing blocks as process 600' with an additional processing block 602 added before processing block 612 and an additional processing block 620 added after processing block 616. The processing block 602 masks close range leakage. For example, process 600" removes false detections that are very close to the SOD system 14. The processing block 620 performs automatic threshold processing. In one example, the automatic threshold processing block 620 removes false peaks (detections). In one example, performing the automatic threshold processing block 620 is performed as described in application Ser. No. 11/322,684 entitled "System And Method For Generating A Radar Detection Threshold," filed Dec. 30, 2005 which is incorporated herein in its entirety. Application Ser. No. 11/322,684 is assigned or has the same obligation of assignment to the same entity as this patent application.

Referring to FIG. 7A, an example of a process to perform FOV processing is a process 700. Process 700 filters and smoothes the raw detections (712). For example, controller 108 filters and smoothes the raw detections received from the DSP processor 104.

Process 700 filters out side-lobe level (SLL) detections (722). For example, the control processor 108 filters out SLL detections.

Process 700 determines FOV detection (732). For example, the control processor 108 determines the closest (in range to the SOD 14) first detection regardless of the receive beam 22a-22g.

Process 700 filters and smoothes FOV detections (742). For example, the control processor 108 filters and smoothes the FOV detections.

Process 700 smoothes the FOV beam (752). For example, the control processor 108 smoothes the FOV beam.

Process 700 coasts through missing data (762). For example, if in the course of processing a curve (e.g., a range versus time curve), x number of data points are missing for certain points in time, process 700 extrapolates the curve forward in time until additional data is received or process 700 waits a predetermined period of time and ceases further extrapolation on the curve. In one example, once additional data points are received, process 700 interpolates the missing x number of data points.

Process 700 determines relative velocity (772). For example, the control processor 108 determines the relative velocity of the detections. In one example, the range rate is averaged over one or more major cycles. In another example, velocity refers to Doppler velocity and is determined from taking the difference in range from an up-chirp and down-chirp divided by the period of the major cycle. In one example, the processing block 772 may be in accordance with application Ser. No. 11/324,035 entitled "Vehicle Radar Systems Having Multiple Operating Modes," filed Dec. 30, 2005 which is incorporated herein in its entirety. The processing block 772 may be in accordance to application Ser. No. 11/323,960 entitled "Generating Event Signals In A Radar System," filed Dec. 30, 2005 which is incorporated herein in its entirety. Both application Ser. No. 11/323,960 and application Ser. No. 11/324,035 are assigned or have the same obligation of assignment to the same entity as this patent application.

Process 700 determines other parameters (782). For example, determines other parameters based on the received beam, the range or both the receive beam and the range. In one example, process 700 determines an azimuth entry parameter that indicates which receive beam 22a-22g first detected the object. In another example, process 700 determines a presence parameter which, for example, indicates if an object is within a certain zone (e.g., a detection zone 24, 25). In a further example, process 700 determines the location of the object detected. In a further example, the process 700 determines duration parameters that determine how long an object has been detected. The duration parameters may correspond to how long scenarios have been going on (for example, the scenarios described in FIGS. 9A-9E).

In one embodiment, process 700 may be performed multiple times in parallel for every received beam 22a-22g individually.

Referring to FIG. 7B, in another embodiment, a process 700' may also be implemented to perform FOV processing. For example, the process 700' includes the same blocks as process 700 with an additional processing block 782 added after processing block 782 and a processing block 786 added after processing block 788. The processing block 786 performs a tracker overlay processing. For example, the tracker overlay processing predicts the future location of an object (e.g., a track). In one example, the track overlay processing block 786 predicts the future position of tracks using an R(ange)-Theta (angle) coordinate system. The beam overlay processing block 788 performs a beam overlay processing. The beam overlay processing block 788 determines, if two detections are relatively close to each other and are determined to be the same object, the location of the object is determined by comparing the magnitudes of the two detections. In one example, the beam overlay processing block 788 determines the location of the object using an x-y coordinate system. In one example, the two detections are determined to be the same detection based on the data from the tracker overlay processing block 786.

As shown in FIG. 7B, the smoothed and filtered FOV detections (as shown in processing block 752) are pre-processed (via the operations shown in processing blocks 762, 772, 782) such that pre-processed data is provided to the tracker (as shown in processing block 786). It should be appreciated, however, that in some embodiments, it may be preferable to provide the smoothed and filtered FOV detections (the so-called "raw detections") as shown in processing block 752 directly to the tracker (i.e. the raw detections from processing block 752 would be provided to processing block 786 without the functions of processing blocks 762-782 being performed). In this case, the tracker would produce the FOV products (shown in FIG. 7B as the outputs from processing blocks 772, 782—e.g. the relative velocity and other parameters). Additionally, the tracker can perform the coast function of processing block 762. The tracker would also continue to perform the tracker overlay processing (as currently shown in processing block 786). Stated differently, in one embodiment the tracker receives raw detections from the FOV processing and produces information including but not limited to coast data, relative velocity and other parameters while in another embodiment the tracker receives data which has been pre-processed to provide information including but not limited to coast data, relative velocity and other parameters. One reason to provide the raw detections directly to the tracker without any pre-processing is that the tracker may be better able to manage the data provided thereto.

Figure 8A:
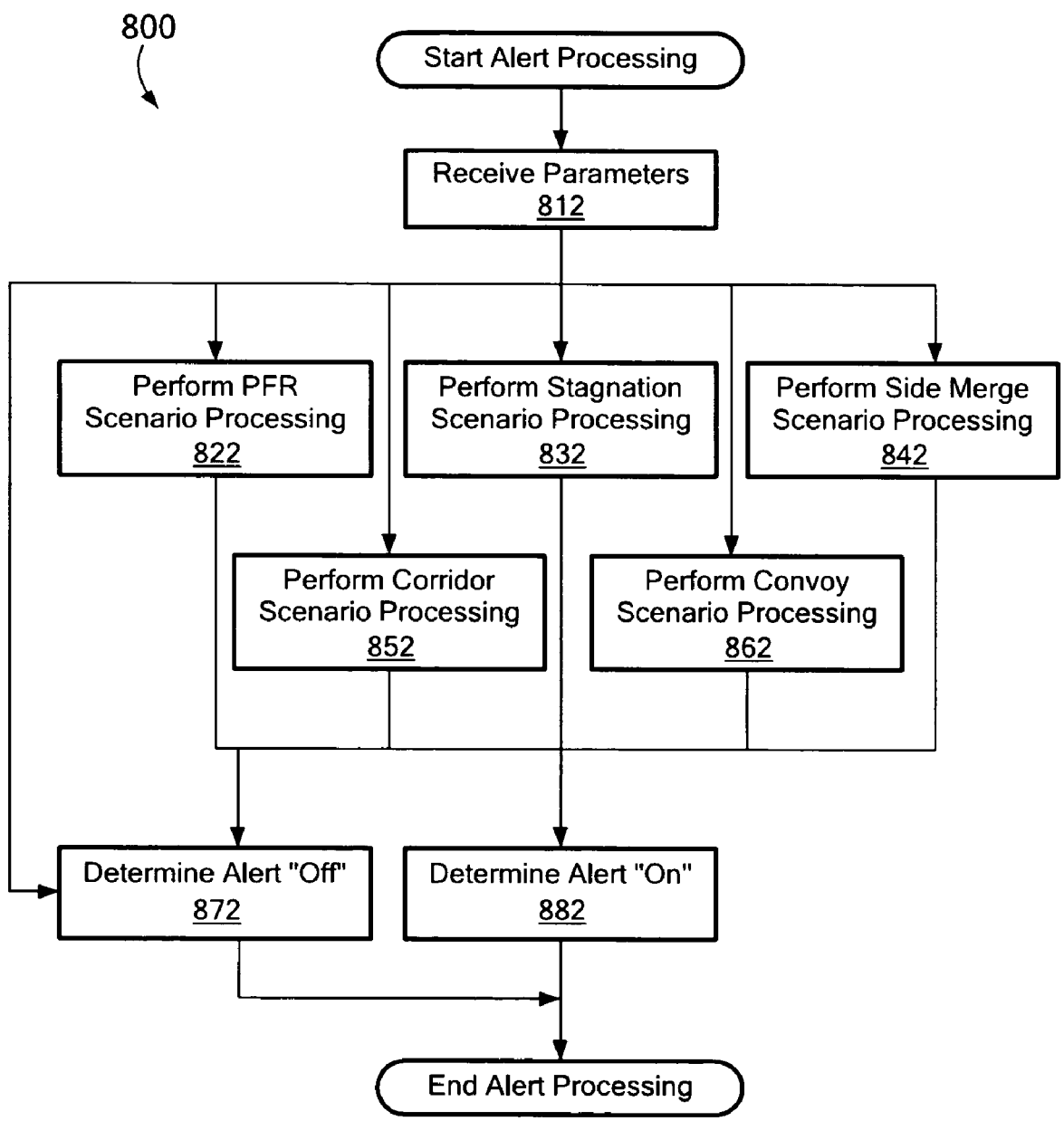
FIGS. 8A, 8B and 8C are flowcharts of examples of processes to perform alert processing.

Referring to FIG. 8A, an example of a process to perform alert processing is a process 800. Process 800 receives the parameters (812). For example, the control processor 108 receives the parameters extracted from the processing block 522 (FIG. 5) to perform the alert processing. In one example, the parameters include smooth range, smooth beam and velocity data. The parameters may also include the azimuth entry parameter, presence parameter, location parameters and the duration parameters. In one example, the control processor 108 saves the last 1-second of extracted parameters.

Process 800 performs scenario processing. For example, process 800 performs a pass-from-rear (PFR) scenario processing (822), a stagnation scenario processing (832), a side merge scenario processing (842), a corridor scenario processing (852) and a convoy scenario processing (862) based on the parameters and past parameters. As will be described below, real-life events may be compared to already stored scenarios to determine which are the most applicable and make a decision as to how SOD system 14 reacts.

Process 800 determines whether to turn off an alert signal (if on, for example) based on the parameters, the past parameters and the results of the scenario processing (872). For example, if process 800 determines from the parameters that an object is no longer important enough, it will reset the alert to off (e.g., a global clear or reset). The results of the scenario processing may also determine whether an alert should be turned off. Process 800 determines whether to turn on an alert signal (if off, for example) based on the results from the scenario processing (882). In one example the processing block 872 may delay turning an alert off. In one example, the processing block 882 may delay turning an alert on. As shown in FIG. 8A, there are many ways (e.g., paths) to determine an alert on and an alert off (e.g., through the scenario processing blocks 822, 832, 842, 852, and 862) depending on the parameters. In one example, the paths may be determined based on if-then statements or other conditional statement logic.

Figure 8B:
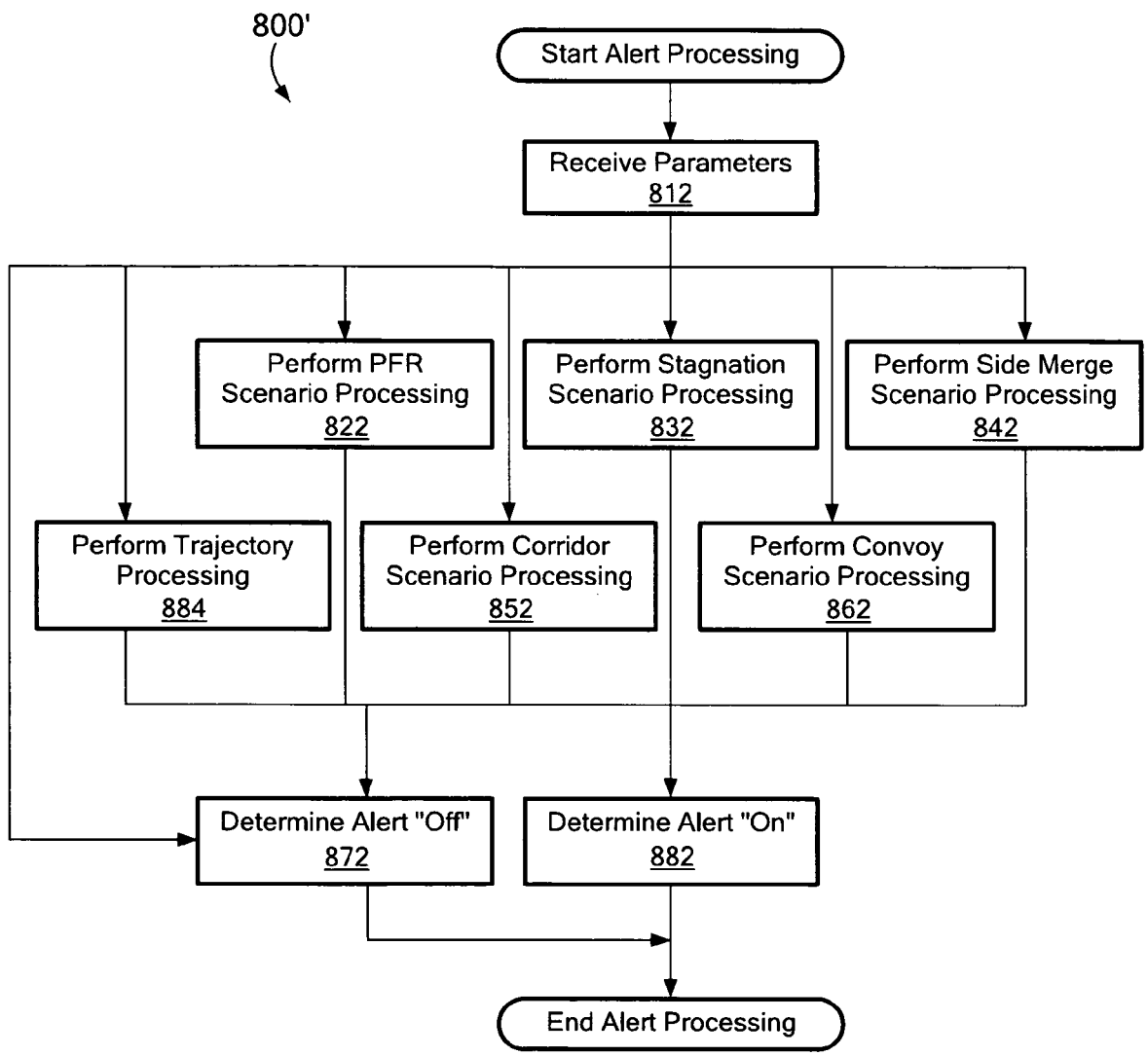

Referring to FIG. 8B, in another embodiment, a process 800' may also be implemented to perform alert processing. For example, the process 800' includes the same blocks as process 800 with an additional processing block 884 added in parallel to processing blocks 822, 832, 842, 852 and 862. The processing block 884 performs trajectory processing. For example, processing block 884 performs one or more scenarios not covered by the other scenario processing blocks 822, 832, 842, 852, and 862. In one example, the processing block uses the data generated from processing blocks 786 and 788 of FIG. 7B. In one example, the processing is performed in an x-y coordinate system.

Figure 8C:
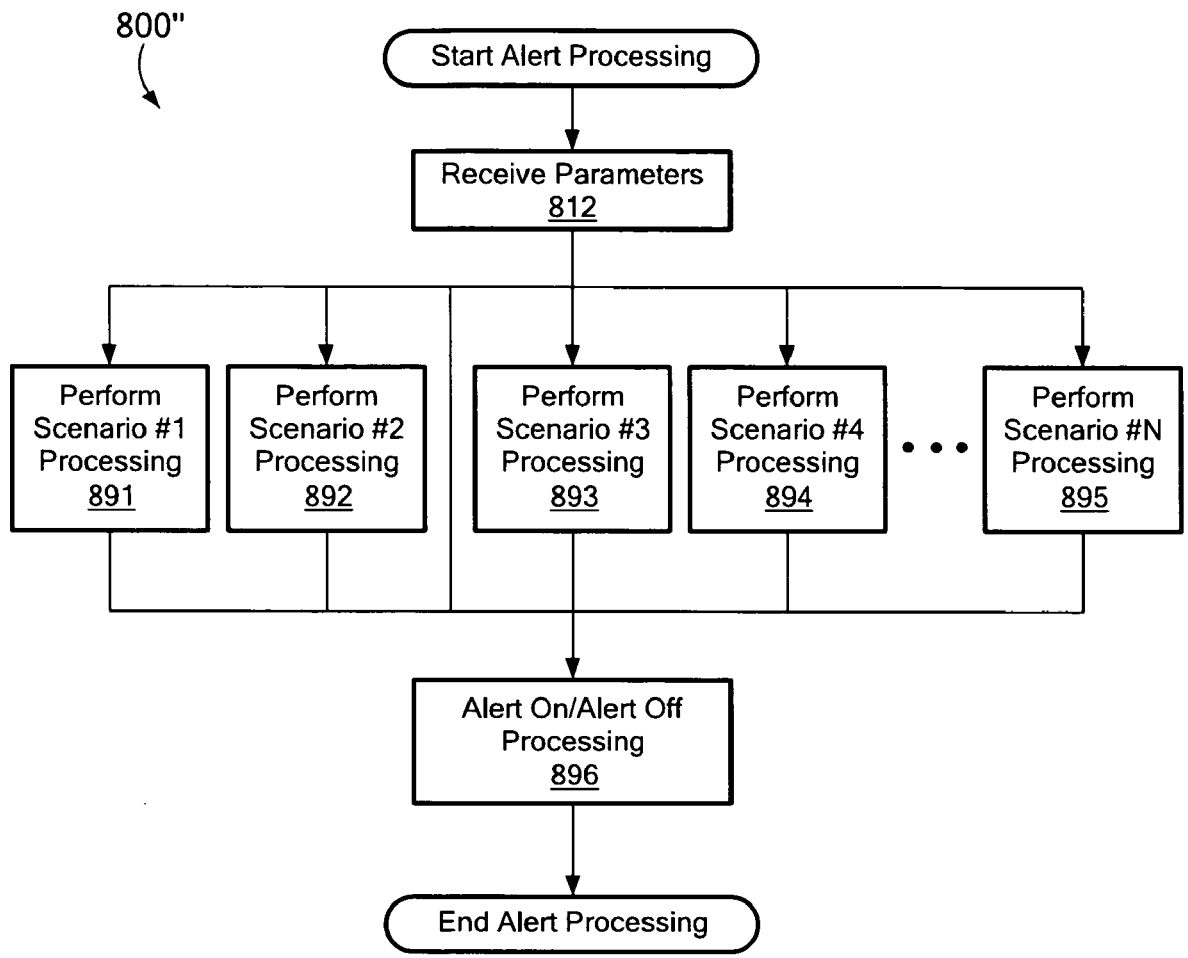

Referring to FIG. 8C, alert processing may be further embodied as in process 800". Processing 800" received the parameters (812). The process 800" performs a scenario #1 processing (891), a scenario #2 processing (892), a scenario #3 processing (893), a scenario #4 processing (894) and a scenario #N processing (895) in parallel. The results from the scenario processing blocks 891-895 and the parameters are used by the processing block 896 to perform the alert-on/alert-off processing. In one example the alert-on/alert-off processing block 896 performs the same processing as processing blocks processing blocks 872 and 882. In one example the processing block 896 may delay turning an alert on or off an alert.

Figure 9A:
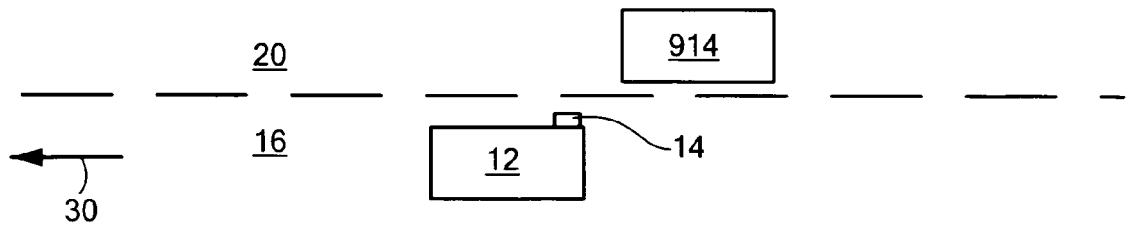
FIGS. 9A to 9E are diagrammatic views of examples of scenarios.

Referring to FIG. 9A, the PFR scenario refers to vehicles (e.g., a vehicle 914) passing the vehicle 12 with the SOD system 14 from the rear of vehicle 12. The vehicles 12, 914 are both traveling in a direction 30 and in respective first and second traffic lanes 16, 20.

Figure 9B:
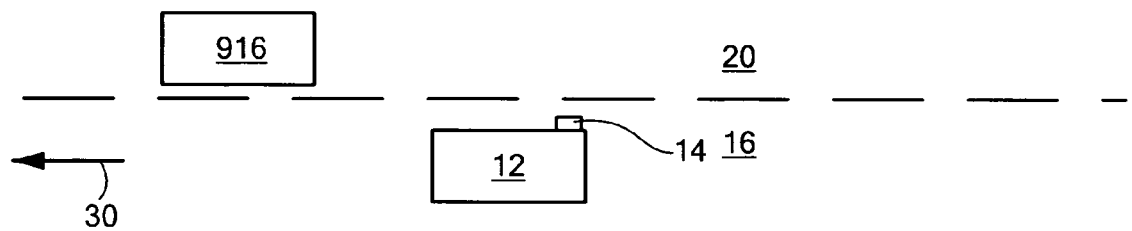

Referring to FIG. 9B, the stagnation scenario refers to vehicles (e.g., a vehicle 916) passing the vehicle 12 with the SOD system 14 from the front of the vehicle 12. The vehicle 12 is traveling in a direction 30 and the vehicle 916 is traveling in a direction opposite the direction 30. The vehicles 12, 916 are traveling in the respective first and second traffic lanes 16, 20.

Figure 9C:
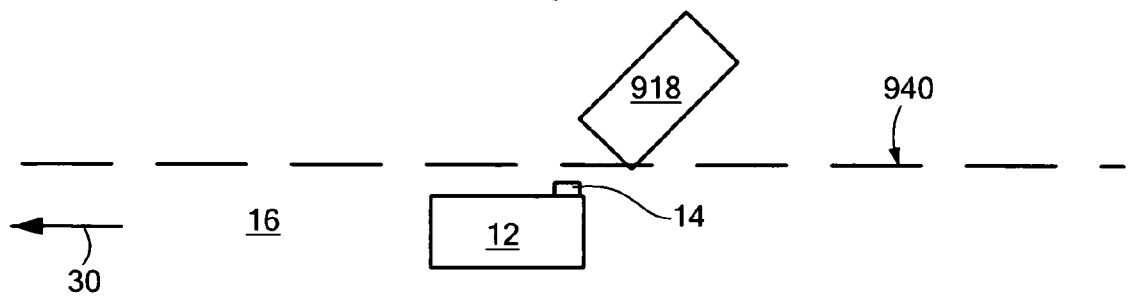

Referring to FIG. 9C, the side merge scenario refers to vehicles (e.g., a vehicle 918) entering the blind spot of the vehicle 12 with the SOD system 14 from the side of the vehicle 12. The vehicle 918 is moving in a direction 940 towards the vehicle 12. The vehicle 12 is traveling the direction 30 in the traffic lane 16.

Figure 9D:
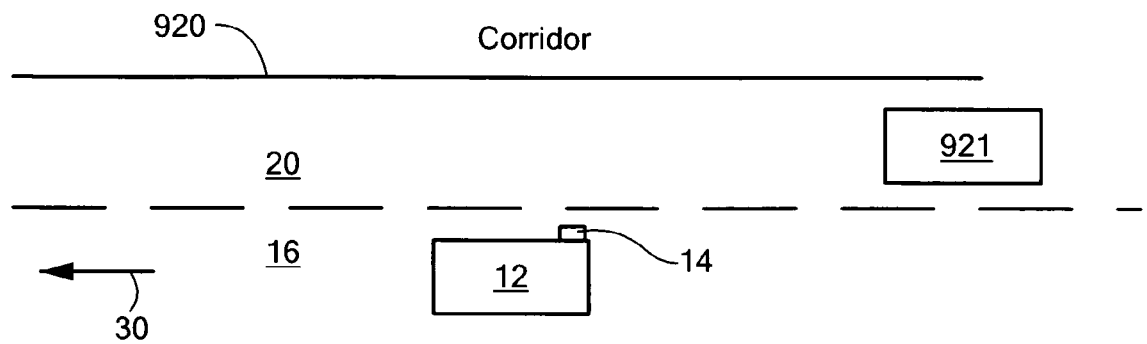

Referring to FIG. 9D, the corridor scenario refers to stationary objects (e.g., a guard rail 920) on the side of the vehicle 12 with the SOD system 14 as another vehicle 921 is passing the vehicle 12 from the rear. The vehicles 12, 921 are both traveling in a direction 30 and in respective first and second traffic lanes 16, 20.

Figure 9E:
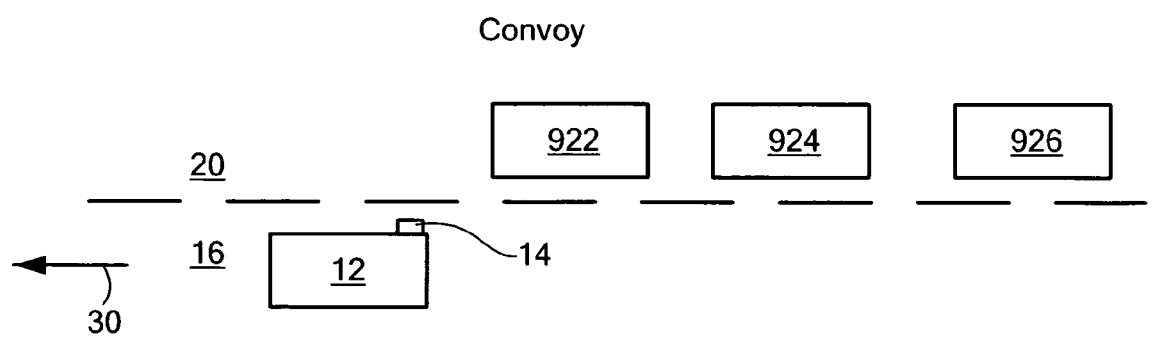

Referring to FIG. 9E, the convoy scenario refers to a convoy of vehicles (e.g., a vehicle 922, a vehicle, 924 and a vehicle 926) passing the vehicle 12 with the SOD system 14 from the rear of the vehicle 12. The vehicles 12, 922, 924, 926 are traveling in the direction 30. The vehicle 12 is in the traffic lane 16 and the vehicles 922, 924, 926 are in the traffic lane 20.

The scenarios described in FIGS. 9A-9E may be further characterized by using range-versus-time graphs. For example, each of the scenarios may be characterized using FIGS. 10A-10E.

Figure 10A:
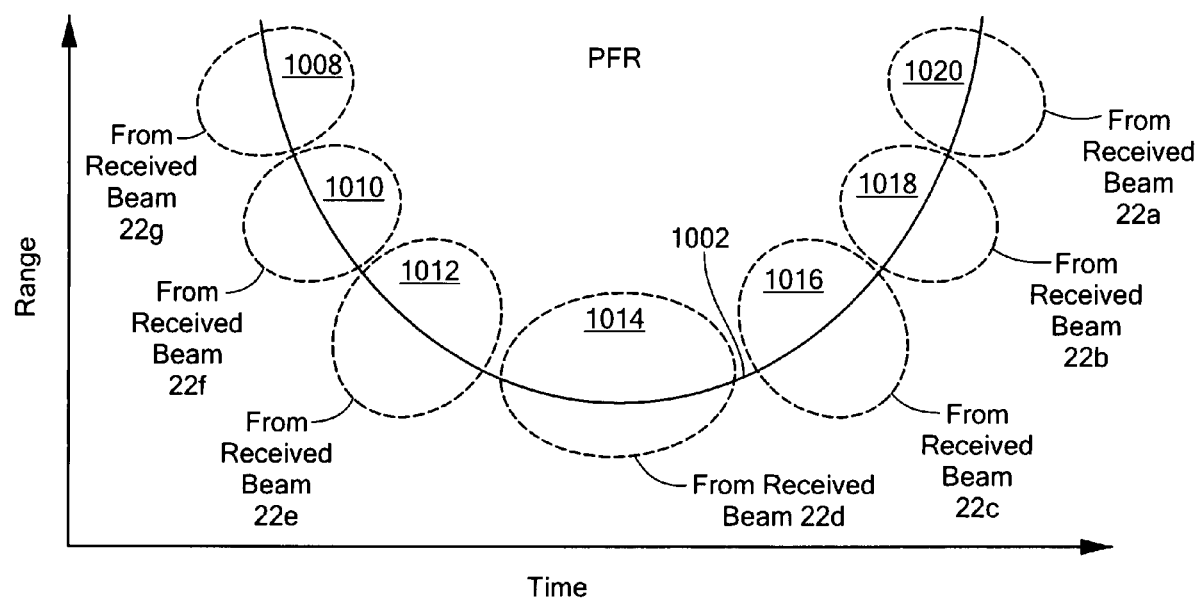
FIG. 10A to 10B are examples of range-versus-time graphs corresponding to the example scenarios in FIGS. 9A to 9E.

In FIG. 10A a range-versus-time graph of a PFR scenario depicts a U-shaped curve 1002 corresponding to the movement of the vehicle 914 (FIG. 9A). The U-shaped curve 1002 is formed in a particular receive beam sequence. For example, a portion 1008 of the curve 1002 comes from the received beam 22g, a portion 1010 of the curve 1002 comes from the received beam 22f, a portion 1012 of the curve 1002 comes from the received beam 22e, a portion 1014 of the curve 1002 comes from the received beam 22d, a portion 1016 of the curve 1002 comes from the received beam 22c, a portion 1018 of the curve 1002 comes from the received beam 22b and a portion 1020 of the curve 1002 comes from the received beam 22a.

Figure 10B:
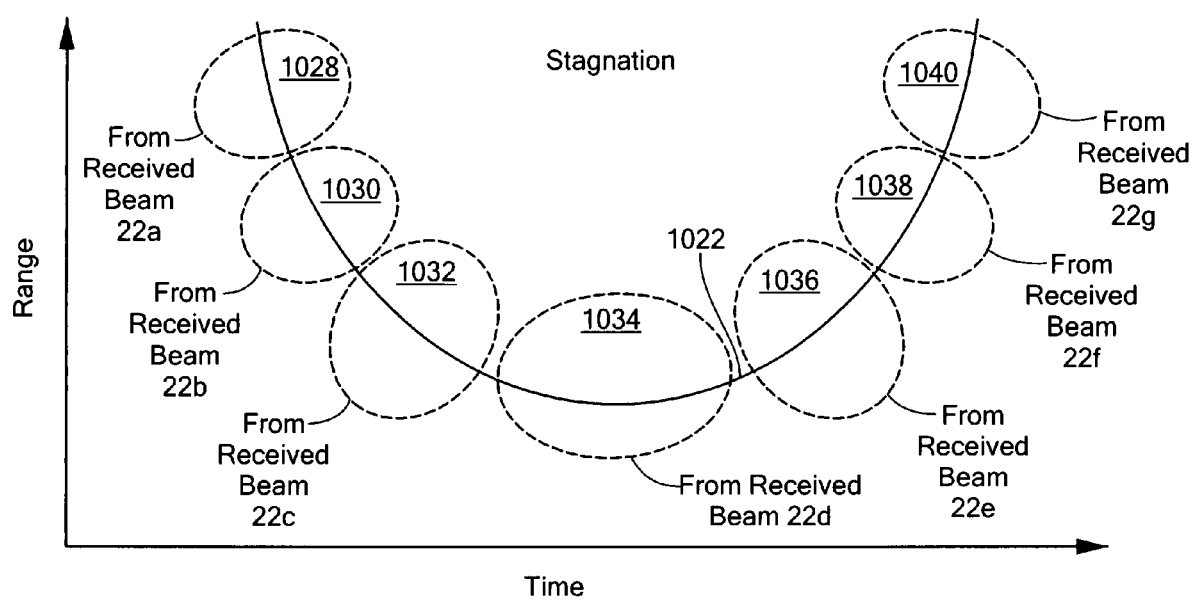

In FIG. 10B a range-versus-time graph of a stagnation scenario depicts a U-shaped curve 1022 corresponding to the movement of vehicle 916 (FIG. 9B). The U-shaped curve 1022 is formed in an opposite beam sequence than the PFR scenario. For example, a portion 1028 of the curve 1022 comes from the received beam 22a, a portion 1030 of the curve 1022 comes from the received beam 22b, a portion 1032 of the curve 1022 comes from the received beam 22c, a portion 1034 of the curve 1022 comes from the received beam 22d, a portion 1036 of the curve 1022 comes from the received beam 22e, a portion 1038 of the curve 1022 comes from the received beam 22f and a portion 1040 of the curve 1022 comes from the received beam 22g.

Figure 10C:
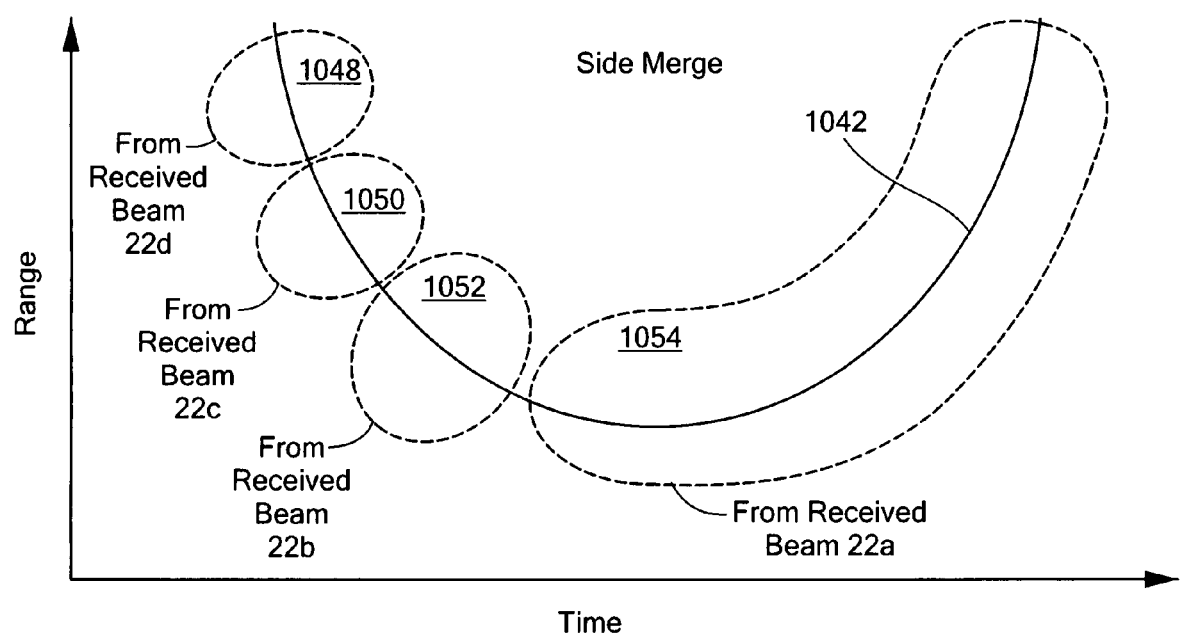
FIG. 10C is a plot of range vs. time for a side-merge scenario.

In FIG. 10C a range-versus-time graph of a side-merge scenario depicts a U-shaped curve 1042 corresponding to the movement of vehicle 918 (FIG. 9C). The U-shaped curve 1042 is formed in a beam sequence different than the PFR scenario and the stagnation scenario. For example, a portion 1048 of the curve 1042 comes from the received beam 22d, a portion 1050 of the curve 1042 comes from the received beam 22c, a portion 1052 of the curve 1042 comes from the received beam 22b, and a portion 1054 of the curve 1042 comes from the received beam 22a.

Figure 10D:
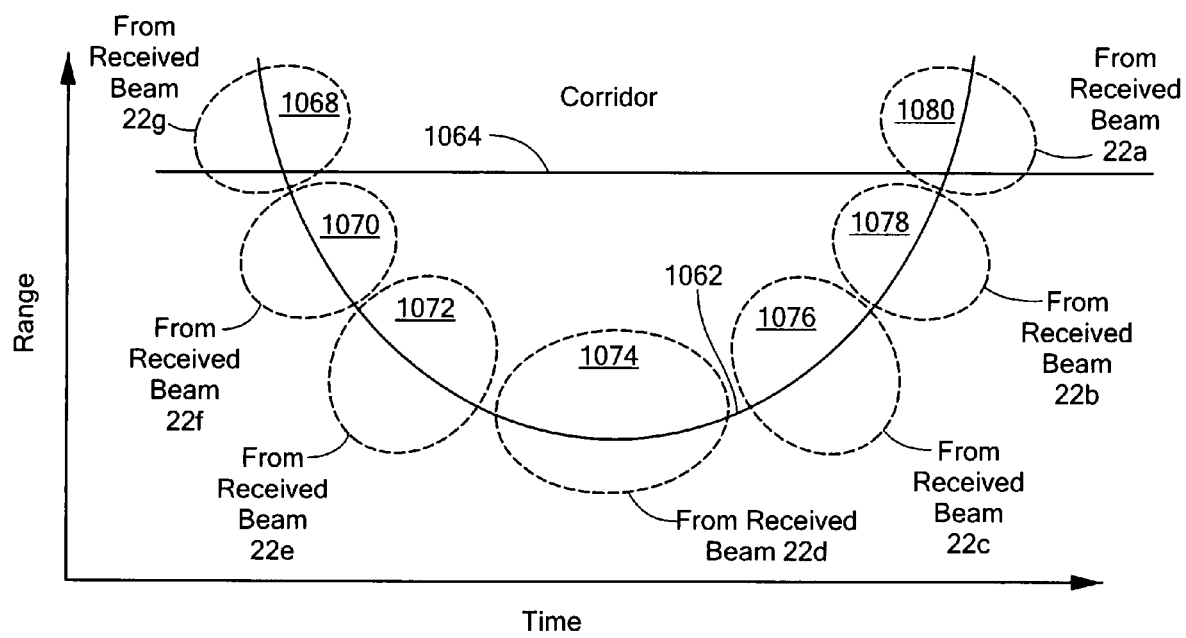
FIG. 10D is a plot of range vs. time for a corridor scenario.

In FIG. 10D a range-versus-time graph of the corridor scenario depicts two curves: a U-shaped curve 1062 corresponding to the movement of vehicle 921 (FIG. 10D) and a line 1064 corresponding to the guard-rail 920 (FIG. 10D). The U-shaped curve 1062 is formed in the same beam sequence as the PFR scenario. For example, a portion 1068 of the curve 1062 comes from the received beam 22g, a portion 1070 of the curve 1062 comes from the received beam 22f, a portion 1072 of the curve 1062 comes from the received beam 22e, a portion 1074 of the curve 1062 comes from the received beam 22d, a portion 1076 of the curve 1062 comes from the received beam 22c, a portion 1078 of the curve 1062 comes from the received beam 22b and a portion 1080 of the curve 1062 comes from the received beam 22a. The line 1064 receives the data from the receive beam 22d.

Figures 10E, 11A:
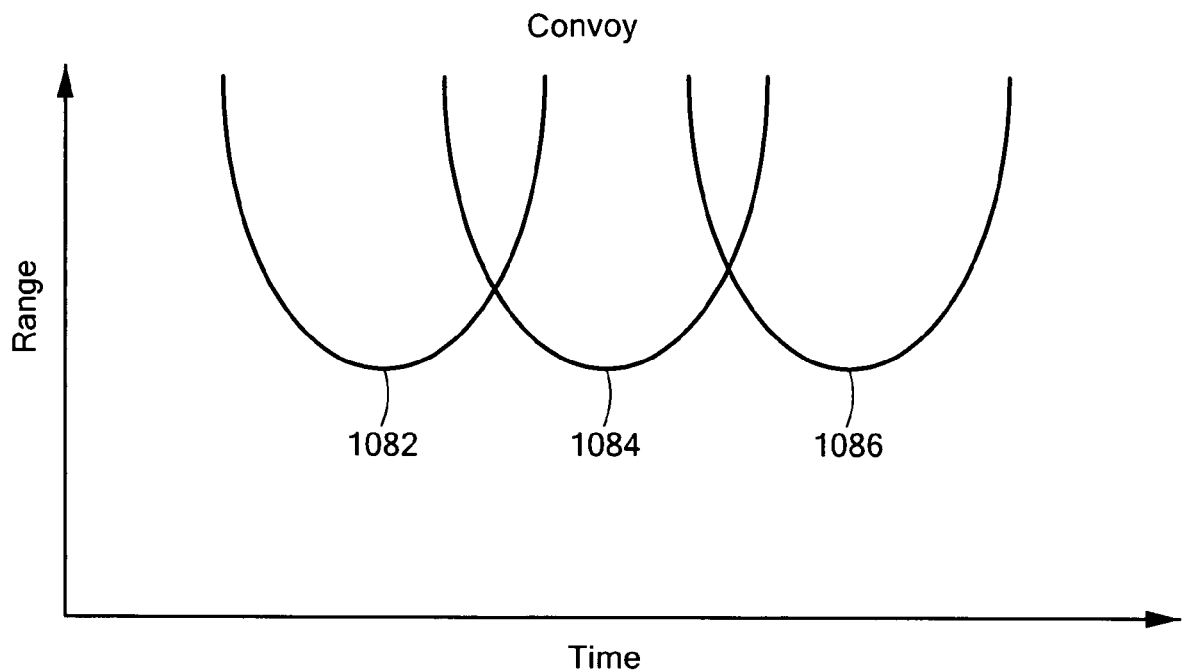
FIG. 10E is a plot of range vs. time for a convoy scenario.
FIGS. 11A and 11B depict examples of logic processing for real-life events.

In FIG. 10E, a range-versus-time graph of the corridor scenario depicts three curves: a U-shaped curve 1082 corresponding to the movement of vehicle 922 (FIG. 10E); a U-shaped curve 1084 corresponding to the movement of vehicle 924 (FIG. 10E); and a U-shaped curve 1086 corresponding to the movement of vehicle 926 (FIG. 10E). The U-shaped curves 1084, 1086, 1088 are formed in the same receive beam sequence as the PFR scenario.

Based on the beam detection, the range and the range rate (relative velocity), for the above scenarios, it is possible using statistical analysis and probabilities to correlate the scenarios to actual real-world events to determine when to send alert messages. For example, referring to FIG. 11A, logical components may be constructed to determine when to send an alert message. For example, consider the vehicle 12 has the SOD system 14 attached as described above. Consider also, that alert processing 532 (FIG. 5) includes an in-zone latch, a closing latch and an alert latch logic. The in-zone latch latches to a logical 1 when an object is within a warning zone, latches to logical 0 when the object is no longer in the warning zone and latches to a logical −1 when the object is not in the warning zone and the object is not closing on the vehicle 12. The closing latch latches to a logical 1 when an object is closing on the vehicle 12 and latches to a logical zero when the object is opening-up on vehicle 12. The alert latch latches to a logical 1 when the in-zone latch and the closing latch are both a logical 1. The alert latch latches to a logical 0 from a logical 1 when the in-zone latch is a logical −1. The alert latch latched to a logical 1 is indicative of an alert being on and the alert latch latched to a logical 0 is indicative to turning the alert being off.

At time $t_1$, the range rate data indicates that an object is closing in on vehicle 12. The closing latch latches to a logical 1. The range data indicates that the object is not within the warning zone. The in-zone latch remains latched to logical 0. The alert latch remains latches to logical 0 because the in-zone latch is logical zero.

At time $t_2$, the range rate data indicates that the object is still closing in on vehicle 12 so the closing latch remains latched to logical 1. The range data indicates that the object is now within the warning zone so that the in-zone latch latches to a logical 1. With the in-zone latch and the closing latch each latched to a logical 1, the alert latch latches to a logical 1.

At time $t_3$, the range rate data indicates that the object is still closing in on vehicle 12 so the closing latch remains latched to logical 1. The range rate data indicates that the object is still in the warning zone so the in-zone latch remains latched to logical 1. With the in-zone latch and the closing latch each still latched to a logical 1, the alert latch remains latched to a logical 1.

At time $t_4$, the range rate data indicates that the object is still closing in on vehicle 12 so the closing latch remains latched to logical 1. The range data indicates that the object is not in the warning zone so the in-zone latch latches to logical 0. With one of the in-zone latch and the closing latch still latched to a logical 1, the alert latch remains latched to a logical 1.

At time $t_5$, the range rate data indicates that the object is not closing in on vehicle 12 so the closing latch latches to logical 0. The range data indicates that the object is in the warning zone so the in-zone latch latches to logical 1. With one of the in-zone latch and the closing latch still latched to a logical 1, the alert latch remains latched to a logical 1.

At time $t_6$, the range rate data indicates that the object is still not closing in on vehicle 12 so the closing latch remains latched to logical 0. The range data indicates that the object is not in the warning zone. Since the object is also not closing the in-zone latch latches to logical −1. With the in-zone latch latched to −1, the alert latch latches to a logical 0.

Figures 11B, 12:
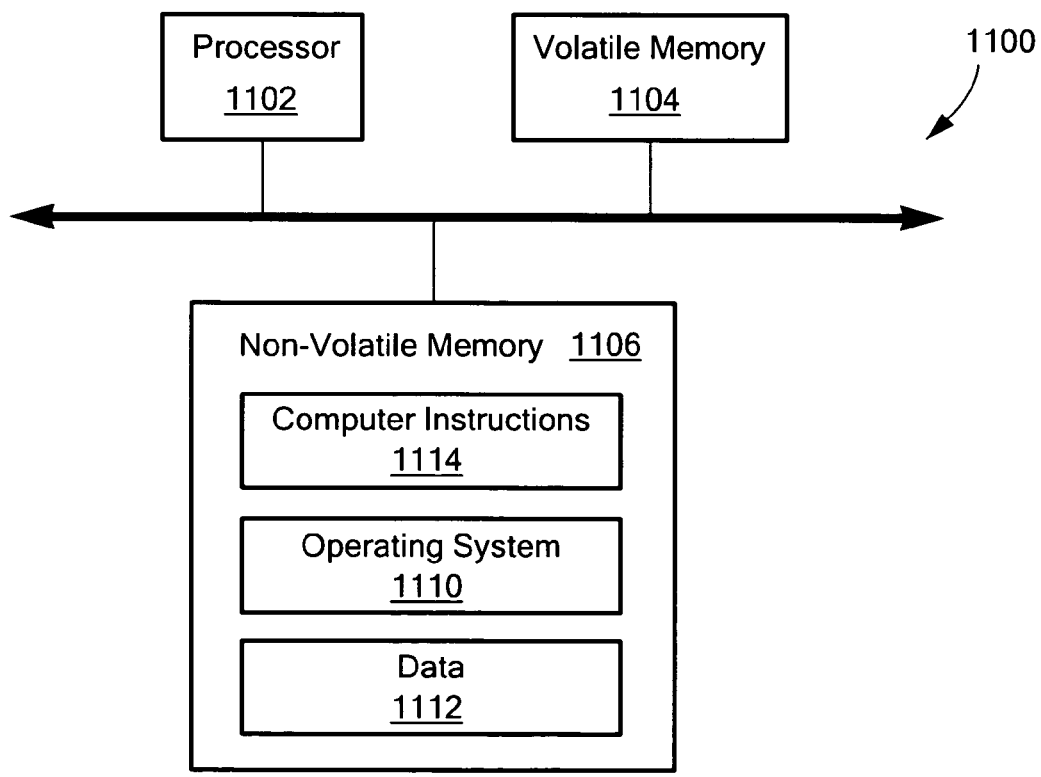
FIG. 12 is a block diagram of a computer system on which the processes of FIGS. 5 to 8A-8C may be performed.

Referring to FIG. 11B, in another example, the latches may incorporate other logic indicative of other different scenarios. For example, consider the vehicle 12 is about to come alongside a guardrail. In this example, the logic gates are the same as used in FIG. 11A except the logic now incorporates the logic that if an object is not closing but within the zone for three time periods and the beam is the receive beam 22d set the in-zone latch to −1.

At time $t_1$, the range rate data indicates that an object is closing on vehicle 12. The closing latch latches to a logical 1. The range data indicates that the object is not within the warning zone and 2.9 meters away. The receive beam is receive beam 22b. The in-zone latch remains latched to logical 0. The alert latch remains latches to logical 0 because the in-zone latch is logical zero.

At time $t_2$, the range rate data indicates that the object is still closing in on vehicle 12 so the closing latch remains latched to logical 1. The range data indicates that the object is within the warning zone and 2.7 meters away. The receive beam is receive beam 22c. The range data also indicates that the object is now within the warning zone so that the in-zone latch latches to a logical 1. With the in-zone latch and the closing latch each latched to a logical 1, the alert latch latches to a logical 1.

At time $t_3$, the range rate data indicates that the object is still closing in on vehicle 12 so the closing latch remains latched to logical 1. The range data indicates that the object is 2.5 meters away. The range data indicates that the object is still in the warning zone so the in-zone latch remains latched to logical 1. With the in-zone latch and the closing latch each still latched to a logical 1, the alert latch remains latched to a logical 1.

At time $t_4$, the range rate data indicates that the object is no longer closing in on vehicle 12 so the closing latch latches to logical 0. The range rate data indicates that the object is 2.5 meters away and in the warning zone so the in-zone latch remains latched to logical 1. With one of the in-zone latch and the closing latch still latched to a logical 1, the alert latch remains latched to a logical 1.

At time $t_5$, the range rate data indicates that the object is still not closing in on vehicle 12 so the closing latch remains latched to logical 0. The range rate data indicates that the object is 2.5 meters away and in the warning zone so the in-zone latch remains latched to logical 1. With one of the in-zone latch and the closing latch still latched to a logical 1, the alert latch remains latched to a logical 1.

At time $t_6$, the range rate data indicates that the object is still not closing in on vehicle 12 so the closing latch remains latched to logical 0. The range data indicates that the object is still 2.5 meters away and in the warning zone. Since the object is also not closing for three consecutive time periods, the in-zone latch latches to logical −1. With the in-zone latch latched to −1, the alert latch latches to a logical 0.

FIG. 12 shows a computer 1100 which includes a processor 1102 and a volatile memory 1104, a non-volatile memory 1106 (e.g., a flash memory). Non-volatile memory 1106 stores operating system 1110 and data 1112. Non-volatile memory 1106 also stores computer instructions 1114, which are executed by processor 1102 out of the volatile memory 1104 to perform all or part of processes 500, 600, 600', 600", 700, 700', 800, 800' and 800".

It should be appreciated that processes 500, 600, 600', 600", 700, 700', 800, 800' and 800" are not limited to use with the hardware and software of FIG. 12; it may find applicability in any computing or processing environment and with any type of machine that is capable of running a computer program. Processes 500, 600, 600', 600", 700, 700', 800, 800' and 800" may be implemented in hardware, software, or a combination of the two. Processes 500, 600, 600', 600", 700, 700', 800, 800' and 800" may be implemented in computer programs executed on programmable computers/machines that each includes a processor, a storage medium or other article of manufacture that is readable by the processor (including volatile and non-volatile memory and/or storage elements). Program code may be applied to data entered using an input device to perform processes 500, 600, 600', 600", 700, 700', 800, 800' and 800" and to generate output information.

The system may be implemented, at least in part, via a computer program product (i.e., a computer program tangibly embodied in an information carrier (e.g., in a machine-readable storage device or in a propagated signal, for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform processes 500, 600, 600', 600", 700, 700', 800, 800' and 800". Processes 500, 600, 600', 600", 700, 700', 800, 800' and 800" may also be implemented as a machine-readable storage medium, configured with a computer program, where upon execution, instructions in the computer program cause the computer to operate in accordance with processes 500, 600, 600', 600", 700, 700', 800, 800' and 800".

The embodiments described herein are not limited to the specific embodiments described herein. For example, the processes are not limited to the specific processing order of FIGS. 5 to 8C. Rather, any of the blocks of FIGS. 5 to 8C may be re-ordered, repeated, combined or removed, performed in parallel or in series, as necessary, to achieve the results set forth above. In another example, the latches used herein may be any n-state latch.

While two SOD systems 14, 15 are shown in FIGS. 1 and 2, the system 50 may include any number of SOD systems, including a single SOD system. While the alert displays 82, 86 are shown to be associated with side-view mirrors, the alert displays may be provided in a variety of ways. For example, in other embodiments, the alert displays may be associated with a rear view mirror (not shown). In other embodiments, the alert displays are audible alert displays.

While the CAN bus 66 is shown and described, it will be appreciated that the SOD systems 14, 15 may couple through any of a variety of other busses within the vehicle 12, including, but not limited to, an Ethernet bus, local interconnect network (LIN) bus and a custom bus.

The system described herein is not limited to use with the hardware and software described above. The system may be implemented in digital electronic circuitry, or in computer hardware, firmware, software, or in combinations thereof.

While three circuit boards 102, 150, 156 are described herein, the SOD system 14 may be provided on more than three or fewer than three circuit boards. Also, the three circuit boards 102, 150, 156 may be comprised of other materials than described herein.

Method steps associated with implementing the system may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer include a processor for executing instructions and one or more memory devices for storing instructions and data.

The system is not limited to the specific examples described herein. For example, while the system described herein is within a vehicle radar system, the system may be used in any system utilizing radar Elements of different embodiments described herein may be combined to form other embodiments not specifically set forth above. Other embodiments not specifically described herein are also within the scope of the following claims.

What is claimed is:

1. A method of generating alert signals in a detection system, comprising:
providing a plurality of receive antenna beams;
receiving signals through multiple ones of the plurality of receive antenna beams wherein at least some those signals received through the multiple ones of the plurality of receive antenna beams correspond to detections;

determining a particular sequence of receive beams in which the detections are received;

comparing the particular sequence of receive beams in which the detections are received with stored scenarios wherein the stored scenarios correspond to at least one of:

(a) a pass-from-the-rear scenario;
(b) a stagnation scenario;
(c) a side-merge scenario;
(d) a corridor scenario; and
(e) a convoy scenario; and in response to a particular sequence of receive beams in which the detections are received matching at least one of the stored scenarios, determining whether to generate an alert signal.

2. The method of claim 1 wherein generating alert signals in a detection system comprises generating alert signals in a vehicle detection system.

3. The method of claim 2 wherein comparing the particular sequence of receive beams in which the detections are received with stored scenarios comprises: using one or more latches to process data from the received signals, the data comprising range data, velocity data and receive beam data.

4. The method of claim 1, further comprising: performing a fast Fourier Transform (FFT) on the received signals; determining peaks from the FFT; and identifying raw detections.

5. The method of claim 4, further comprising averaging the FFTs by receive beam.

6. The method of claim 5, further comprising: masking close-range leakage; and performing automatic threshold processing.

7. The method of claim 4, further comprising: filtering and smoothing the raw detections; filtering side-lobe detections; determining a field of view detection; and filtering and smoothing the field of view detection.

8. The method of claim 7 wherein determining a field of view detection comprising determining a closest detection to a receiver the received signals.

9. The method of claim 7, further comprising: performing a tracker overlay processing: and performing a beam overlay processing.

10. The method of claim 7, further comprising determining parameters, the parameters including a relative velocity.

11. The method of claim 10, further comprising: performing a first scenario processing using the parameters; and performing a second scenario processing using the parameters.

12. The method of claim 11, further comprising determining to send an off alert signal based on the first scenario processing and the second scenario processing and the parameters.

13. The method of claim 11, further comprising determining to send an on alert signal based on the first scenario processing and the second scenario processing.

14. An automotive radar system comprising:

a transmit system for generating a transmit signal emitted from the automotive radar system via said transmit antenna;

a receiving system adapted to simultaneously generate a plurality of receive antenna beams and adapted to receive signals through each of the plurality of receive antenna beams, said receiving system comprising a memory having one or more scenarios stored therein, said stored scenarios corresponding to at least one of:
(a) a pass-from-the-rear scenario;
(b) a stagnation scenario;
(c) a side-merge scenario;
(d) a corridor scenario; and
(e) a convoy scenario;

said receiving system for receiving signals through one or more of the plurality of receive antenna beams and for those signals received through each of the one or more plurality of receive antenna beams and corresponding to detections, determining a particular sequence of receive beams in which the detections are received and comparing the sequence of detections with one or more of the stored scenarios and determining whether to generate an alert signal based upon results of the comparison.

15. The automotive radar system of claim 14 wherein said transmit system comprises a transmit antenna and a transmitter coupled to said transmit antenna.

16. The automotive radar system of claim 14 wherein said receiving systems comprises: a receive antenna adapted to generate one or more receive antenna beams; and a receiver coupled to receive signals from one or more of the one or more receive antenna beams; and a storage device having the one or more scenarios stored therein.

17. The automotive radar system of claim 14 wherein said receiver comprises one or more latches to process the extracted data from the received signals and compare the data extracted from received signals with the stored scenarios.

18. The automotive radar system of claim 17 wherein the data corresponds to at least one of range data; velocity data; and receive beam data.

19. The automotive radar system of claim 17 wherein said receiving system comprises a fast Fourier Transform (FFT) processor which performs an FFT on the received signals, determines peaks from the FFT and identifies raw detections.

20. The automotive radar system of claim 19 wherein said receiving system further comprises: a raw detections filter for filtering and smoothing the raw detections; a side-lobe detection filter for filtering side-lobe detections; a field of view processor (FOV) for determining a field of view detection; and a FOV filter for filtering and smoothing the field of view detection.

21. The automotive radar system of claim 19 wherein said a FOV processor determines a field of view detection by determining which of one or more received signals corresponds to a closest detection to said receiver.

22. The automotive radar system of claim 19 wherein said receiving system further comprises a tracker for performing a tracker overlay processing and for performing a beam overlay processing.

23. The automotive radar system of claim 19 wherein said receiving system determines parameters and performs first and second scenario processing using the parameters.

24. The automotive radar system of claim 23 wherein in response to said first and second scenario processing and/or said parameters, said receiving system determines when to send at least one of an on alert signal and an off alert signal.

25. The automotive radar system of claim 14 wherein said receiving system comprises: an RF receiver adapted to receive one or more RF receive signals from one or more receive antenna beams; a FOV processor coupled to receive signals form said receiver and to provide raw detections at an output thereof; a pre-processor having an input coupled to an output of said FOV processor, said pre-processor adapted to receive the raw detections from said FOV processor and to provide FOV products at an output thereof; and a tracker having an input coupled to an output of said pre-processor, said tracker adapted to receive the FOV products from the pre-processor and to provide tracker output signals at an output thereof.

26. The automotive radar system of claim 14 wherein said receiving system comprises: an RF receiver adapted to receive one or more RF receive signals from one or more receive antenna beams; a FOV processor coupled to receive signals form said receiver and to provide raw detections at an output thereof; and a tracker having an input coupled to the output of said FOV processor, said tracker adapted to receive the raw detections from said FOV processor and to provide products and tracker output signals at an output thereof.

* * * * *